(12) United States Patent
Suzuki et al.

(10) Patent No.: US 8,761,793 B2
(45) Date of Patent: Jun. 24, 2014

(54) INFORMATION DISTRIBUTION SYSTEM, AND VEHICLE-MOUNTED DEVICE

(75) Inventors: Hiroyuki Suzuki, Yokohama (JP);
Nobuyuki Hotta, Hachiouji (JP); Hideo Shimoshimano, Tokyo (JP); Takuya Ogura, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 940 days.

(21) Appl. No.: 12/934,173

(22) PCT Filed: Mar. 26, 2009

(86) PCT No.: PCT/JP2009/056067
§ 371 (c)(1),
(2), (4) Date: Jan. 20, 2011

(87) PCT Pub. No.: WO2009/119714
PCT Pub. Date: Oct. 1, 2009

(65) Prior Publication Data
US 2011/0201373 A1 Aug. 18, 2011

(30) Foreign Application Priority Data

Mar. 26, 2008 (JP) .................................. 2008-082044

(51) Int. Cl.
*H04W 24/00* (2009.01)
(52) U.S. Cl.
USPC .................. 455/456.1; 455/456.3; 340/932.2; 340/988
(58) Field of Classification Search
CPC ............ G08G 1/09; G07B 15/00; H04W 4/04
USPC ........... 455/404.2, 407, 408, 433, 440, 456.1, 455/569.2, 152.1, 345, 456.3, 238.1, 76, 455/517; 340/932.2, 933, 988, 991, 426.16, 340/426.19, 426.2, 426.22, 901, 905, 908, 340/909, 919
See application file for complete search history.

(56) References Cited

U.S. PATENT DOCUMENTS 5,301,223 A * 4/1994 Amadon et al. ............... 455/409
5,642,398 A * 6/1997 Tiedemann et al. ....... 455/426.1
(Continued)

FOREIGN PATENT DOCUMENTS

JP 2002-176403 6/2002
(Continued)

OTHER PUBLICATIONS

Written Notification of Reason for Refusal (Application No. 2008-082044) dated Feb. 21, 2012.
(Continued)

*Primary Examiner* — Nay A Maung
*Assistant Examiner* — Angelica M Perez
(74) *Attorney, Agent, or Firm* — Eric J. Robinson; Robinson Intellectual Property Law Office, P.C.

(57) ABSTRACT

Provided is an information distribution system (100), in which a control section (4) deletes, when a member registration cancellation of a distribution service is instructed by an input unit (1*d*) of a vehicle-mounted device (10), the contents information and the uplink information stored in a storage unit (1*f*), other than the fundamental information, thereby to set ON a member registration cancellation flag. If the member registration cancellation flag is set ON when the communication with a center apparatus (30) is established, moreover, the control section (4) writes a code indicating the member registration cancellation, in the fundamental information of the uplink information, and transmits the same to the center apparatus (30). When this center apparatus (30) receives the uplink information from the vehicle-mounted device (10), the center apparatus (30) decides whether or not the code indicating the member registration cancellation is contained in the fundamental information. If the center apparatus (30) decides that the code is contained, the center apparatus (30) deletes, from a member information DB (341), the member registration information of the record having the vehicle-mounted device ID of the sender vehicle-mounted device (10). As a result, it is possible to cancel the member registration of the distribution service of the content information in the vehicle-mounted device.

8 Claims, 19 Drawing Sheets

(56) References Cited

U.S. PATENT DOCUMENTS

| | | | |
|---|---|---|---|
| 6,804,605 B2 * | 10/2004 | Flick | 701/484 |
| 7,079,019 B1 * | 7/2006 | Ruggiero | 340/457.4 |
| 7,324,893 B2 * | 1/2008 | Yamashita et al. | 701/117 |
| 8,082,164 B2 * | 12/2011 | Kakuta et al. | 705/5 |

FOREIGN PATENT DOCUMENTS

| JP | 2002176403 | * | 6/2002 |
|---|---|---|---|
| JP | 2004-310301 | | 11/2004 |
| JP | 2004-320570 | | 11/2004 |
| JP | 2004310301 | * | 11/2004 |
| JP | 2004320570 | * | 11/2004 |
| JP | 2005-201713 | | 7/2005 |
| JP | 2005201713 | * | 7/2005 |
| JP | 2007-127519 | | 5/2007 |

OTHER PUBLICATIONS

International Search Report for Application Serial No. PCT/JP2009/056067 dated May 19, 2009.
Notification of Transmittal of Translation of the International Preliminary Report on Patentability (Application No. PCT/JP2009/056067) dated Nov. 25, 2010.

* cited by examiner

| ⋮ |
|---|
| VEHICLE-MOUNTED DEVICE ID |
| CAR NAVIGATION SECTION SETTING INFORMATION |
| HOME REGISTRATION POINT INFORMATION |
| MEMORY POINT INFORMATION |
| CONTENT INFORMATION |
| UPLINK INFORMATION |
| MEMBER REGISTRATION CANCELLATION FLAG |

FIG. 4B

| | |
|---|---|
| FUNDAMENTAL INFORMATION | PROVIDER CODE |
| | DESTINATION INFORMATION |
| | WAY POINT INFORMATION |
| | CUMULATIVE TRAVELING DISTANCE INFORMATION |
| | TASTE GENRE TABLE VERSION INFORMATION |
| | TASTE GENRE DATA |
| | MEMBER INFORMATION |
| | ⋮ |
| PAST DROP-IN PLACE INFORMATION | |
| RECEPTION/REPRODUCTION HISTORY INFORMATION | |

FIG. 5

| ITEM | | | |
|---|---|---|---|
| PROVIDER CODE | | | |
| DESTINATION | ⋮ | | |
| | PRESENCE OR ABSENCE OF DESTINATION IDENTIFIER | | |
| | GEOGRAPHICAL COORDINATE SYSTEM IDENTIFICATION FLAG | | |
| | ⋮ | | |
| | LATITUDE | DEGREES | |
| | | MINUTES | |
| | | SECONDS | |
| | | AFTER DECIMAL POINT | |
| | ⋮ | | |
| | LONGITUDE | DEGREES | |
| | | MINUTES | |
| | | SECONDS | |
| | | AFTER DECIMAL POINT | |
| ⋮ | | | |
| WAY POINT IDENTIFICATION FLAG | | | |
| WAY POINT 1 | GEOGRAPHICAL COORDINATE SYSTEM IDENTIFICATION FLAG | | |
| | ⋮ | | |
| | LATITUDE | DEGREES | |
| | | MINUTES | |
| | | SECONDS | |
| | | AFTER DECIMAL POINT | |
| | ⋮ | | |
| | LONGITUDE | DEGREES | |
| | | MINUTES | |
| | | SECONDS | |
| | | AFTER DECIMAL POINT | |
| ⋮ | ⋮ | | |

| WAY POINT 5 | GEOGRAPHICAL COORDINATE SYSTEM IDENTIFICATION FLAG | | |
| --- | --- | --- | --- |
| | ⋮ | | |
| | LATITUDE | DEGREES | |
| | | MINUTES | |
| | | SECONDS | |
| | | AFTER DECIMAL POINT | |
| | ⋮ | | |
| | LONGITUDE | DEGREES | |
| | | MINUTES | |
| | | SECONDS | |
| | | AFTER DECIMAL POINT | |

| CUMULATIVE TRAVELING DISTANCE |
| --- |
| ⋮ |
| TASTE GENRE TABLE VERSION |
| TASTE GENRE DATA |
| ⋮ |
| THE NUMBER OF PIECES OF MEMBER INFORMATION IDENTIFICATION FLAG |
| MEMBER INFORMATION 1 |
| ⋮ |
| MEMBER INFORMATION 8 |

| No. | VEHICLE-MOUNTED DEVICE ID | MEMBER NAME | ADDRESS | ... | ACQUIRED POINTS |
|---|---|---|---|---|---|
| 1 | 123-4567 | SATO ○○ | SHINJUKU-KU, TOKYO ··· | ... | 10 |
| 2 | 225-3456 | TANAKA □□ | SAITAMA-CITY, SAITAMA-KEN ··· | ... | 20 |
| 3 | 778-9134 | SUZUKI △△ | YOKOHAMA-CITY, KANAGAWA-KEN ··· | ... | 30 |
| ⋮ | ⋮ | ⋮ | ⋮ | ⋮ | ⋮ |

FIG. 8

| ID | CLASSIFICATION | INFORMATION |
|---|---|---|
| 00 | COMPOSITION ID INFORMATION | ID INCLUDED IN CONTENT INFORMATION |
| 01 | PROVIDER INFORMATION | PROVIDER CODE |
| | | PROVIDER NAME DISPLAY TEXT |
| | | ⋮ |
| 02 | CONTENTS INFORMATION | INFORMATION PROVIDER COMPANY CODE |
| | | INFORMATION PROVIDER COMPANY NAME DISPLAY TEXT |
| | | INFORMATION CODE |
| | | INFORMATION TITLE DISPLAY TEXT |
| | | TASTE DATA CATEGORY INFORMATION |
| 03 | | IMMEDIATE REPRODUCTION/ACCUMULATION CODE |
| 04 | EXPIRATION TIME INFORMATION | START YEAR/MONTH/DAY/HOUR/MINUTE/SECOND |
| | | END YEAR/MONTH/DAY/HOUR/MINUTE/SECOND |
| ⋮ | ⋮ | ⋮ |
| 10 | OBJECT POINT INFORMATION | OBJECT POINT COORDINATE INFORMATION |
| | | SERVICE NAME DISPLAY TEXT |
| | | DISPLAY CHARACTER DATA |
| | | DISPLAY IMAGE DATA |
| | | PHONOGRAPHIC CHARACTER STRING DATA |
| | | COMPRESSED SPEECH DATA |
| | | URL INFORMATION |
| | | AFFILIATED PARKING LOT INFORMATION |
| | | ICON DISPLAY IMAGE DATA |
| ⋮ | ⋮ | ⋮ |
| 30 | TRANSITION INFORMATION | NEXT REPRODUCTION INFORMATION CODE 1 |
| | | ⋮ |
| | | NEXT REPRODUCTION INFORMATION CODE 8 |
| ⋮ | ⋮ | ⋮ |
| 40 | DETAILS INFORMATION | DETAILS INFORMATION DATA |
| | | DETAILS INFORMATION DISPLAY TEXT |
| | | DETAILS INFORMATION PHONOGRAPHIC CHARACTER STRING DATA |
| ⋮ | ⋮ | ⋮ |

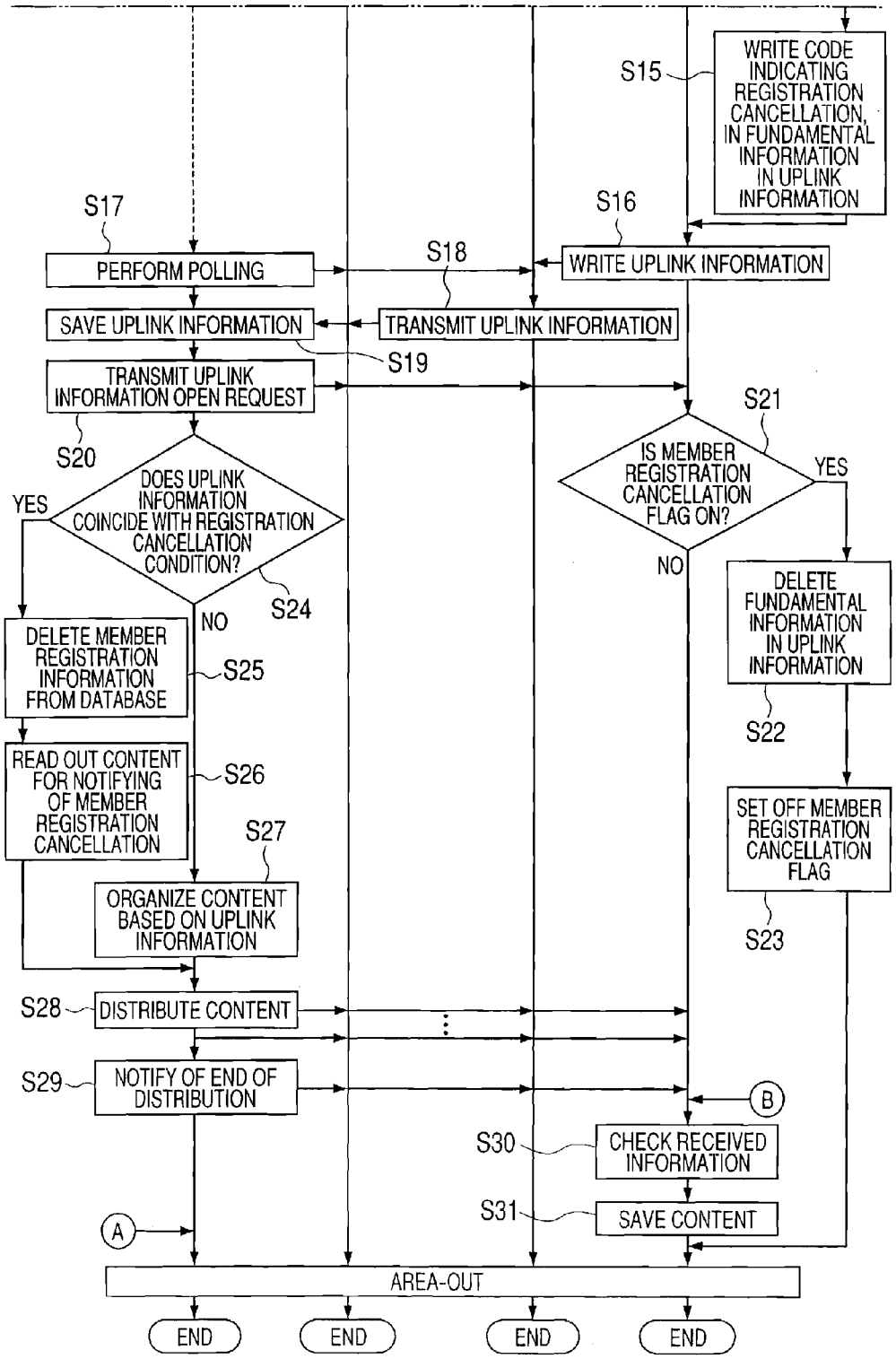

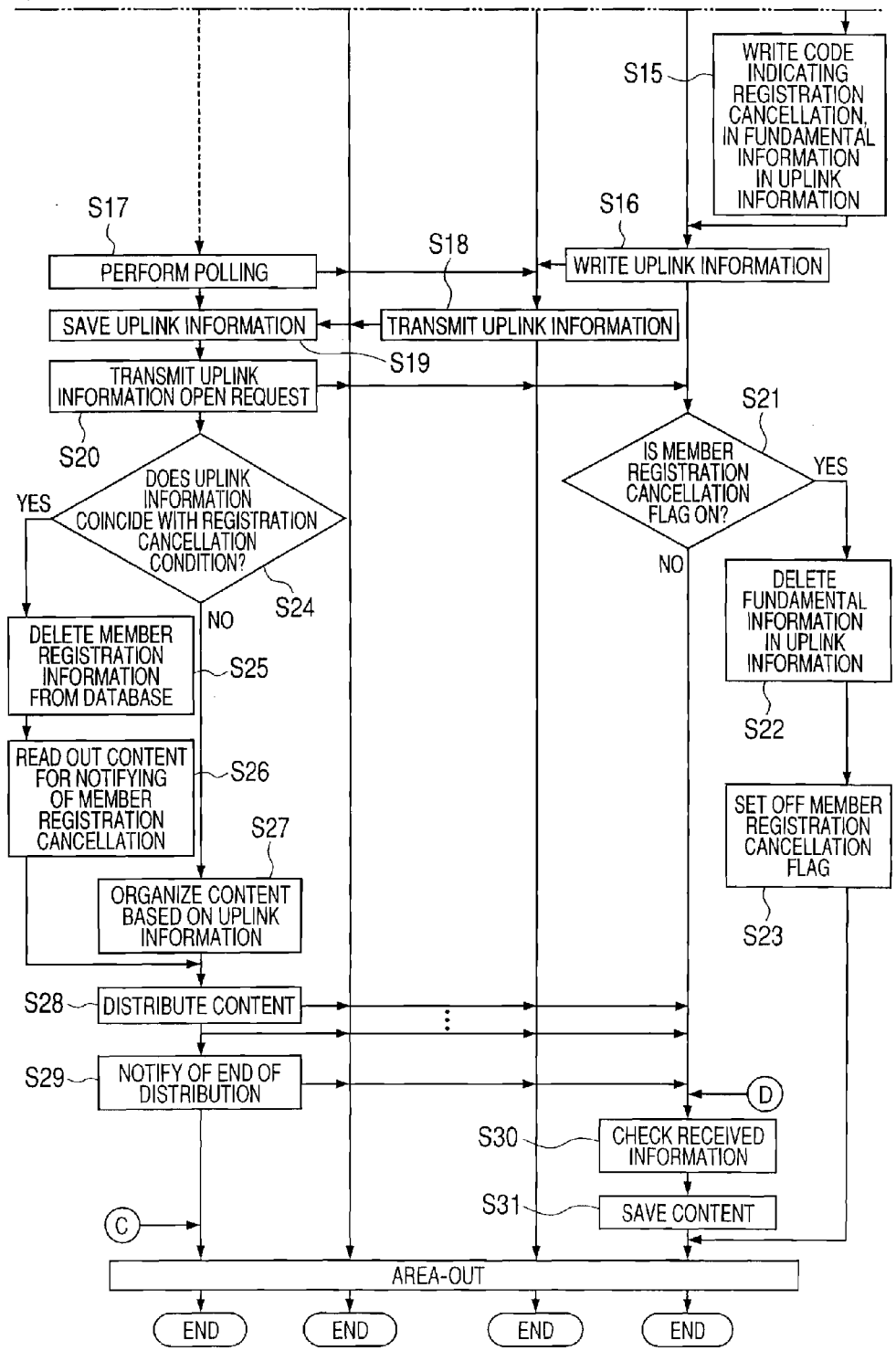

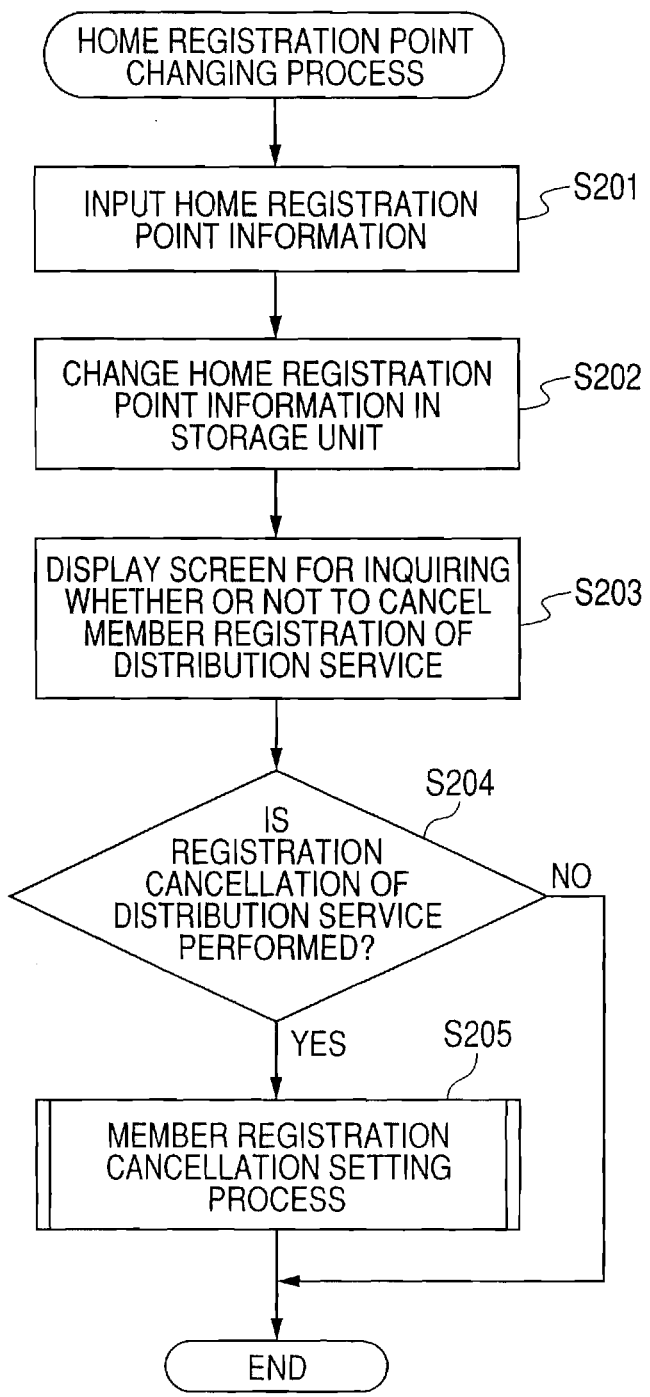

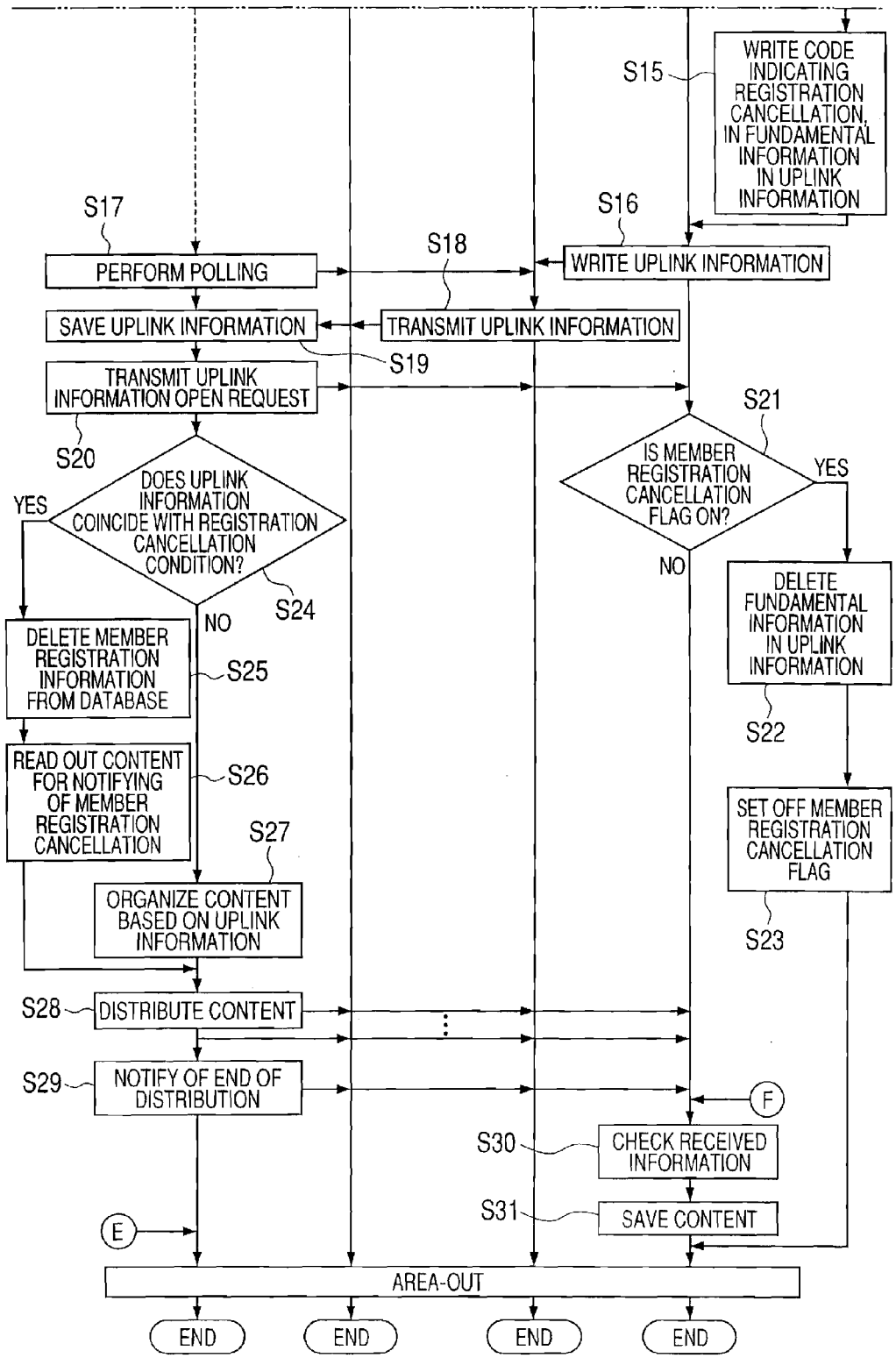

INFORMATION DISTRIBUTION SYSTEM, AND VEHICLE-MOUNTED DEVICE

TECHNICAL FIELD

The present invention relates to an information distribution system and a vehicle-mounted device.

BACKGROUND ART

Conventionally, a vehicle-mounted device such as a navigation apparatus can use DSRC (Dedicated Short Range Communication) to perform wireless communication with a roadside apparatus installed on a road, in a parking lot, or the like, and can be provided with content information regarding facilities (for example, stores, medical institutions and the like) around an own vehicle, via the roadside apparatus from a center apparatus (for example, see Patent Document 1).
Patent Document 1: Japanese Patent Application Laid-Open No. 2007-109032

An information distribution system, in which the DSRC communication is used to distribute information from the center apparatus to the vehicle-mounted device, has a mechanism for, in order to suit substance of the information to be distributed, to a user in the vehicle as much as possible, providing information regarding the distribution of the content information, such as the user's taste and advertisements viewed by the user in the past, to the center apparatus. The center apparatus organizes and distributes the content information which is suitable for the user in the vehicle, based on the information provided by the vehicle-mounted device.

DISCLOSURE OF THE INVENTION

Problems to be Solved by the Invention

However, the information which can be transmitted from the vehicle-mounted device to the center apparatus is limited to fundamental information which is used by the center apparatus for content distribution. Consequently, a user who is a member of a content distribution service cannot perform member registration cancellation of the distribution service or the like from the vehicle-mounted device, and personal information on a previous user can remain in the vehicle-mounted device or the center apparatus.

An object of the present invention is to enable the member registration cancellation of the distribution service of the content information in the vehicle-mounted device.

Means for Solving the Problems

According to a first aspect of the present invention, an information distribution system of the present invention is an information distribution system in which a center apparatus for distributing content information and a vehicle-mounted device are connected via a roadside apparatus so that data can be transmitted and received, wherein the vehicle-mounted device includes member registration cancellation setting means for setting member registration cancellation information on a distribution service of the content information; writing means for determining whether or not the member registration cancellation information is set, and if the member registration cancellation information is set, writing information indicating member registration cancellation in predetermined items of uplink information to be transmitted to the center apparatus; and uplink information transmission means for transmitting the uplink information to the center apparatus, and the center apparatus determines whether or not the information indicating the member registration cancellation is included in the predetermined items of the uplink information received from the vehicle-mounted device, and if the information indicating the member registration cancellation is included, deletes member registration information corresponding to the vehicle-mounted device which is a sender of the uplink information, from a member registration database.

According to a second aspect of the present invention, a vehicle-mounted device of the present invention is a vehicle-mounted device, including communication means for transmitting and receiving data to and from a center apparatus for distributing content information, via a roadside apparatus; member registration cancellation setting means for setting member registration cancellation information on, a distribution service of the content information; writing means for determining whether or not the member registration cancellation information is set, and if the member registration cancellation information is set, writing information indicating member registration cancellation in predetermined items of uplink information to be transmitted to the center apparatus; and uplink information transmission means for transmitting the uplink information to the center apparatus by the communication means.

The vehicle-mounted device of the present invention further includes storage means for storing the content information distributed from the center apparatus, and the uplink information to be transmitted to the center apparatus, wherein when the member registration cancellation setting means sets the member registration cancellation information on the distribution service of the content information, the member registration cancellation setting means deletes the content information and the uplink information which are stored in the storage means.

The vehicle-mounted device of the present invention further includes operating means for instructing to perform the member registration cancellation of the distribution service, wherein if the instruction to perform the member registration cancellation of the distribution service has been issued through the operating means, the member registration cancellation setting means sets the member registration cancellation information on the distribution service.

The vehicle-mounted device of the present invention further includes home registration spot storage means for storing home registration spot information; and operating means for instructing to change the home registration spot information stored in the home registration spot storage means, wherein if the home registration spot information stored in the home registration spot storage means has been changed in response to an operation of the operating means, the member registration cancellation setting means sets the member registration cancellation information on the distribution service.

The vehicle-mounted device of the present invention further includes current location detection means for detecting position information on a current location; parking detection for detecting parking of a vehicle on which the vehicle-mounted device is mounted; home registration spot storage means for storing home registration spot information; and home registration spot changing means for, when the parking of the vehicle on which the vehicle-mounted device is mounted has been detected by the parking detection, if the number of times in which the position information on the current location detected by the current location detection means and position information indicated by the home registration spot information stored in the home registration spot storage means do not coincide with each other has exceeded a predefined reference number of times, changing the home registration spot information stored in the home registration spot storage means to the position information on the current location, wherein if the home registration spot information stored in the home registration spot storage means has been changed by the home registration spot changing means, the member registration cancellation setting means sets the member registration cancellation information on the distribution service.

The vehicle-mounted device of the present invention further includes current location detection means for detecting position information on a current location; parking detection for detecting parking of a vehicle on which the vehicle-mounted device is mounted; home registration spot storage means for storing home registration spot information; and home registration spot changing means for, when the parking of the vehicle on which the vehicle-mounted device is mounted has been detected by the parking detection, determining whether or not the number of times of parking of the vehicle at the current location detected by the current location detection means has exceeded a predefined reference number of times, and if it is determined that the number of times of stop has exceeded the predefined reference number of times, changing the home registration spot information stored in the home registration spot storage means to the position information on the current location detected by the current location detection means, wherein if the home registration spot information stored in the home registration spot storage means has been changed by the home registration spot changing means, the member registration cancellation setting means sets the member registration cancellation information on the distribution service.

Effect of the Invention

According to the present invention, the member registration cancellation of the distribution service of the content information can be performed in the vehicle-mounted device.

BRIEF DESCRIPTION OF THE DRAWINGS

FIG. 4(a) is a diagram showing a data storage example of a storage unit if of FIG. 3, and FIG. 4(b) is a diagram showing a data configuration example of uplink information of FIG. 4(a);

FIG. 5 is a diagram showing a data format when fundamental information in the uplink information is transmitted to a center apparatus;

FIG. 8 is a diagram showing a data configuration example of content information distributed by the center apparatus of FIG. 1;

FIG. 13 is a flowchart showing a home registration spot changing process executed in step S4 of FIG. 12;

Figure 1:
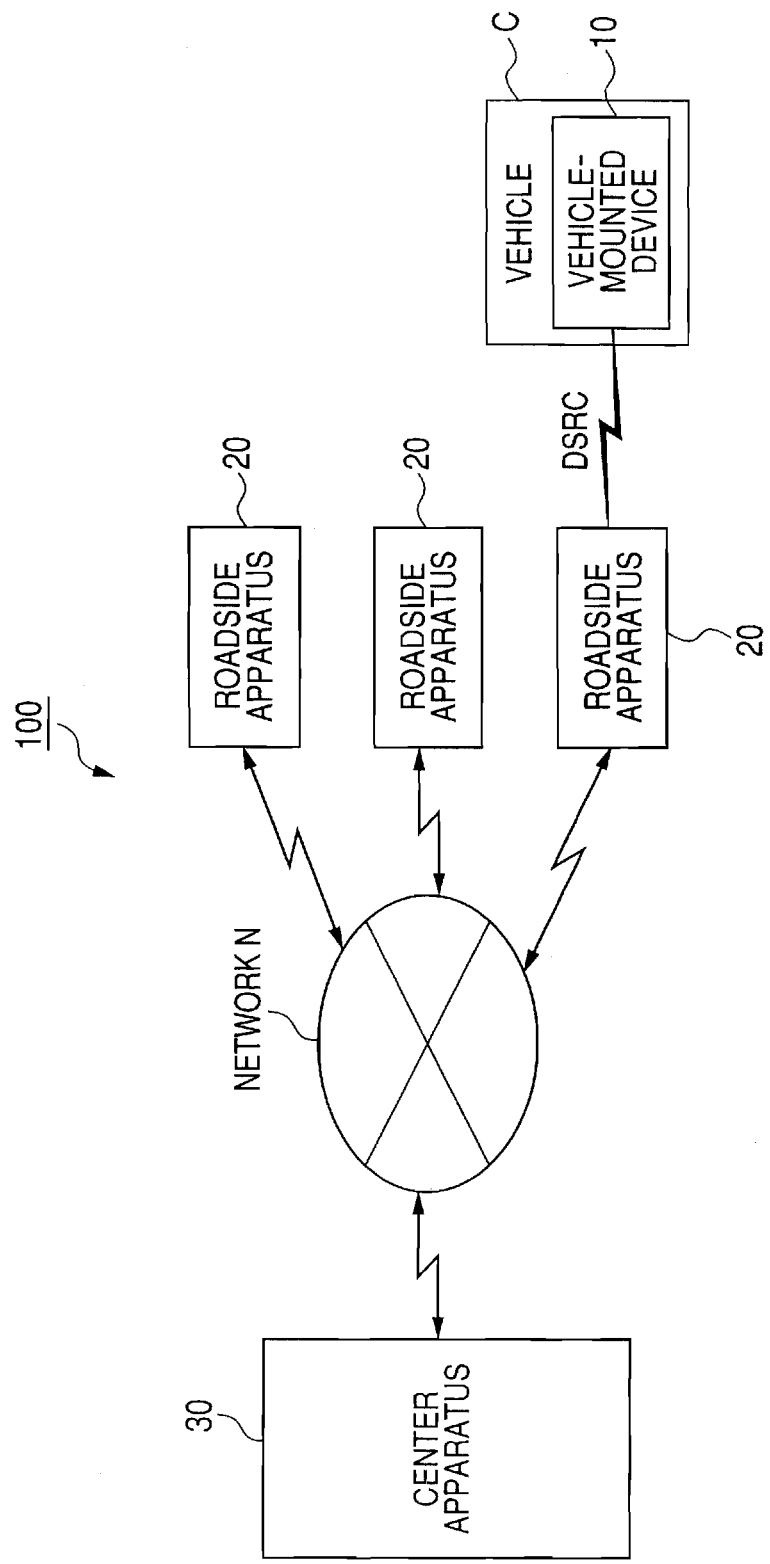
FIG. 1 is a diagram showing an information distribution system in the present embodiment.

DESCRIPTION OF REFERENCES 100 information distribution system
10 vehicle-mounted device
1 car navigation section
1$a$ car navigation control unit
1$b$ current location detection unit
1$c$ map storage unit
1$d$ input unit
1$e$ display unit
1$f$ storage unit
1$g$ speech output unit
2 communication module
3 DSRC section
3$a$ DSRC control unit
3$b$ communication unit
3$c$ storage unit
M uplink information storage area
3$e$ ETC processing unit
3$f$ IC card I/F
4 control section
20 roadside apparatus
30 center apparatus
31 control unit
32 input unit
33 display unit
34 storage unit
341 member information DB
35 communication unit

BEST MODES FOR CARRYING OUT THE INVENTION

Hereafter, embodiments according to the present invention will be described in detail with reference to the accompanying drawings. However, the scope of the invention is not limited to examples shown in the drawings.

<First Embodiment>

First, a configuration of a first embodiment will be described.

FIG. 1 shows an information distribution system 100 in the present embodiment.

As shown in FIG. 1, the information distribution system 100 is configured to include a vehicle-mounted device 10 mounted on a vehicle C, a roadside apparatus 20, and a center apparatus 30, and the center apparatus 30 distributes content information to the vehicle-mounted device 10 via the roadside apparatus 20. A plurality of the roadside apparatuses 20 are installed on a road, in a parking lot, and the like, and each roadside apparatus 20 is connected to the center apparatus 30 via a network N. Moreover, wireless communication is enabled between the roadside apparatus 20 and the vehicle-mounted device 10 of the vehicle C traveling on the road.

Substance of the content information distributed to the vehicle-mounted device 10 by the center apparatus 30 includes, for example, service guides of various facilities such as stores, parking lots and medical facilities around the vehicle C, and the like.

Hereafter, each included apparatus will be described in detail.

Figure 2:
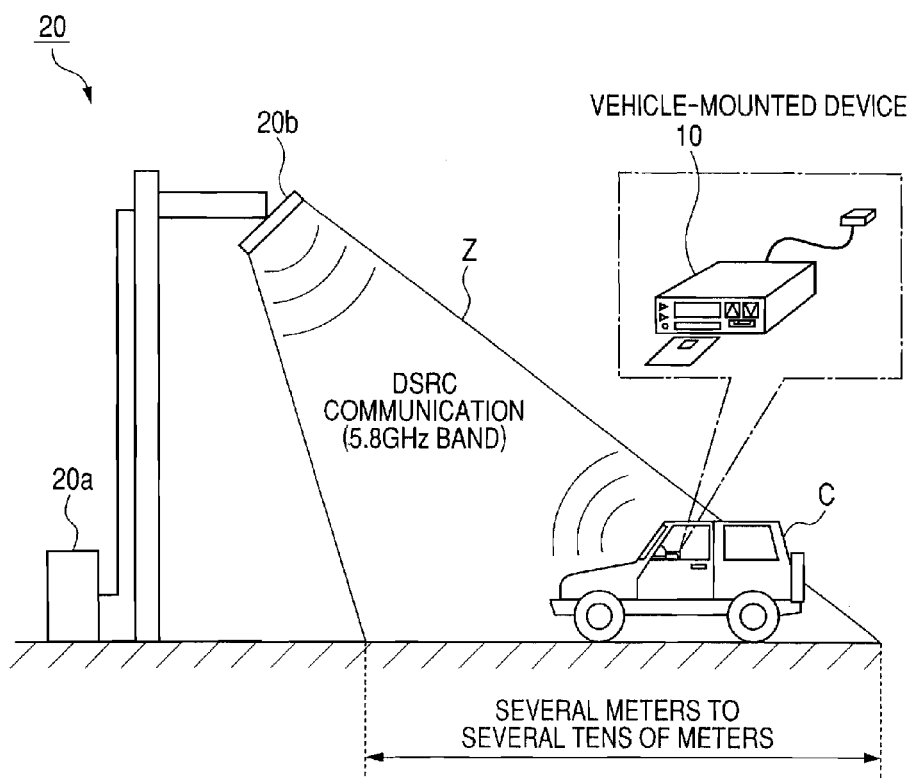
FIG. 2 is a diagram explaining an intercommunication area of a roadside apparatus of FIG. 1.

The roadside apparatus 20 is configured with a main body apparatus 20a and an antenna 20b, as shown in FIG. 2. The roadside apparatus 20 emits a DSRC electric wave with a limited arrival distance, from the antenna 20b installed at a side of the road, above the road, in the parking lot, in a roadside station, or the like, and forms an intercommunication area Z near the roadside apparatus 20. Two-way short range wireless communication is enabled only with the vehicle-mounted device 10 of the vehicle C in this intercommunication area Z. Hereafter, the short range wireless communication between the roadside apparatus 20 and the vehicle-mounted device 10 may be referred to as "road-vehicle communication".

DSRC is a communication system using an electric wave of 5.8 GHz band, and a communication range thereof is, for example, several meters to several tens of meters. Since all DSRC transmission outputs from the roadside apparatus 20 are set to an equal degree, the respective intercommunication areas Z formed by the plurality of the roadside apparatuses 20 are approximately constant regardless of installation locations.

The main body apparatus 20a performs a process for serving as an intermediary for communication of information between the vehicle-mounted device 10 and the center apparatus 30. In other words, the main body apparatus 20a transfers information received from the vehicle-mounted device 10, via the antenna 20b to the center apparatus 30, and transfers the content information transmitted from the center apparatus 30, to the vehicle-mounted device 10. As the main body apparatus 20a, a computer terminal including a control unit for performing information processing and communication control, a storage unit, and the like, is applicable.

The vehicle-mounted device 10 is mounted on the vehicle C, and has a navigation function for performing a process for guiding to a guidance route, and the like, and in addition, a function for performing a process for using an ETC (Electronic Toll Collection System) through the DSRC, and the like.

Figure 3:
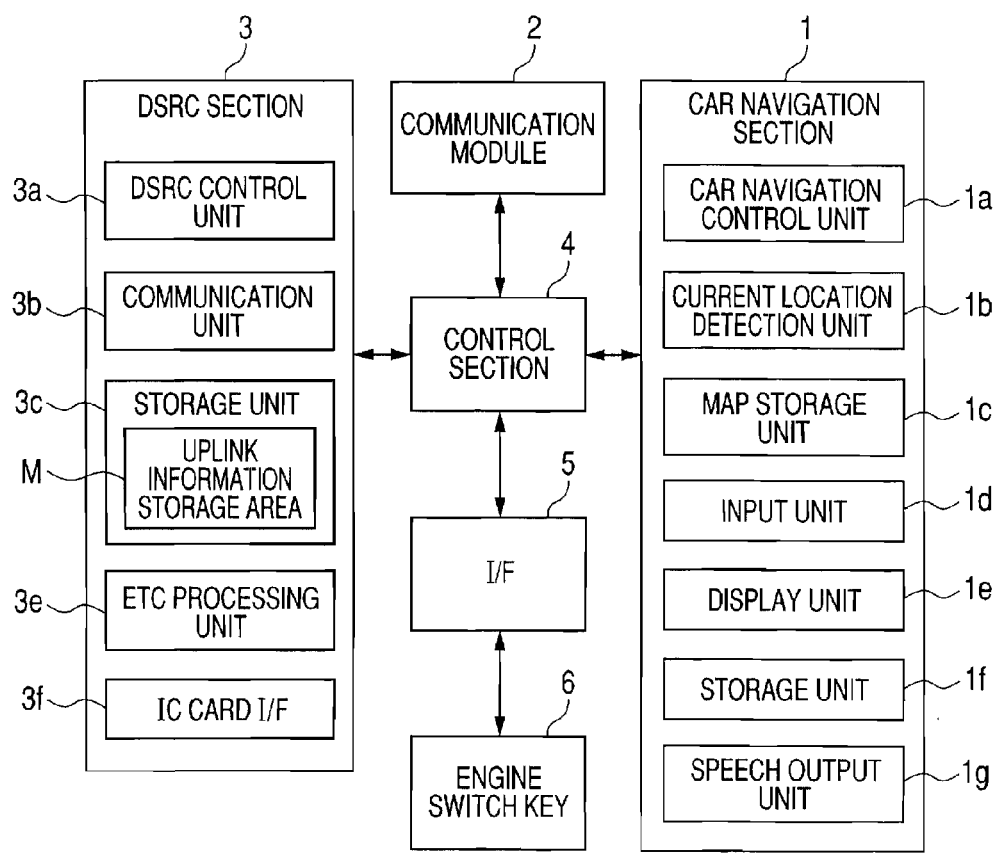
FIG. 3 is a block diagram showing a functional configuration of a vehicle-mounted device of FIG. 1.

As shown in FIG. 3, the vehicle-mounted device 10 is configured to include a car navigation section 1, a communication module 2, a DSRC section 3, a control section 4, and an I/F 5.

The control section 4 is configured with a CPU (Central Processing Unit), a RAM (Random Access Memory) and the like, and performs various calculations in cooperation with a control program stored in a storage unit 1f, and in addition, controls the respective units in a centralized manner.

For example, when the road-vehicle communication with the roadside apparatus 20 is performed, a communication operation of the DSRC section 3 is controlled. It should be noted that, for the control of the DSRC section 3, the control is performed in cooperation with a DSRC control unit 3a of the DSRC section 3. Moreover, saving, reproduction control and the like of the content information received from the center apparatus 30 via the DSRC section 3 are performed.

Moreover, the control section 4 functions as parking detection for detecting an input of a signal (OFF signal) indicating that an engine switch key 6 has been turned OFF, via the I/F 5, that is, detecting engine stop of the vehicle C, and thereby detecting parking of the vehicle C (own vehicle).

The car navigation section 1 includes a car navigation control unit 1a, a current location detection unit 1b, a map storage unit 1c, an input unit 1d, a display unit 1e, the storage unit 1f, a speech output unit 1g, and the like, and performs a process for guiding the vehicle C to the guidance route.

The car navigation control unit 1a calculates the guidance route from a current location of the vehicle C to a destination set via the input unit 1d, based on information on the current location acquired from the current location detection unit 1b, map information stored in the map storage unit 1c, and the like. In addition, the map information stored in the map storage unit 1c is used to generate a map screen for guiding to the calculated guidance route, and the map screen is displayed on the display unit 1e.

The current location detection unit 1b includes various sensors such as a GPS antenna, an angular sensor, a direction sensor, and a distance sensor, and detects the current location of the vehicle C based on results of detection made by these sensors. The GPS antenna detects a GPS signal transmitted from a GPS satellite. Moreover, the angular sensor detects an acceleration of the vehicle (a rotation speed in a horizontal direction per unit time) indicating a variation in a direction of movement, and the direction sensor detects terrestrial magnetism and detects an absolute direction of the vehicle. Based on the respective detection results acquired from these sensors, the current location detection unit 1b generates current location information indicating the current location of the vehicle (information on longitude, latitude and the like), and outputs the current location information to the car navigation control unit 1a.

The map storage unit 1c is configured with a recording medium such as a memory or a DVD, and stores the map information required for guidance display, guide information (road information, traffic jam information and the like) received via the communication module 2, and the like.

The input unit 1d as operating means is configured with a touch panel or the like which is configured integrally with an operation key and the display unit 1e. The input unit 1d generates operation signals corresponding to operations thereof, and outputs the operation signals to the control section 4.

The display unit 1e includes a monitor, and displays various information, such as, for example, a setting screen, the map screen, and a screen for displaying the content information received from the center apparatus 30, on the monitor according to the control by the control section 4.

The storage unit 1f is configured with a nonvolatile memory or the like, and stores the control program executed by the control section 4 or the car navigation control unit 1a, and parameters, data and the like required for executing the program.

Moreover, as shown in FIG. 4(a), the storage unit if has a "vehicle-mounted device ID" area, a "car navigation section setting information" area, a "home registration spot information" area, a "memory spot information" area, a "content information" area, an "uplink information" area, a "member registration cancellation flag" area, and the like. The "vehicle-mounted device ID" area stores a vehicle-mounted device ID of the vehicle-mounted device 10. The "car navigation section setting information" area stores various setting information on the car navigation section 1. The "home registration spot information" area stores position information (latitude/longitude) on a home of a user of the vehicle-mounted device 10. The "memory spot information" area stores position information (latitude/longitude) on a spot which has been registered as a memory spot. The "content information" area saves the content information received from the center apparatus 30. The "uplink information" area stores uplink information to be provided to the center apparatus 30. The "member registration cancellation flag" area stores a member registration cancellation flag indicating whether or not member registration cancellation of a distribution service has been set. It should be noted that the vehicle-mounted device ID may be stored in a storage unit 3c.

Here, the uplink information is information which is used when it is determined in the center apparatus 30 what substance is included in the content information to be distributed to the vehicle-mounted device 10. If there are a plurality of providers to which the user of the vehicle-mounted device 10 has subscribed for the distribution service of the content information, the uplink information is generated for each provider with substance depending on each provider by the control section 4, and is stored in the storage unit 1f. The uplink information is constantly updated so as to include the most recent substance by the control section 4, and saved in the storage unit 1f.

FIG. 4(b) shows a data configuration example of the uplink information. As shown in FIG. 4(b), the uplink information is configured to include "fundamental information", "past drop-in place information" and "reception/reproduction history information".

"Fundamental information" includes information on items such as "provider code", "destination information", "way point information", "cumulative traveling distance information", "taste genre table version information", "taste genre data", and "member information".

"Provider code" is information for specifying the provider to which the user has previously subscribed for the distribution of the content information.

"Destination information" is information on latitude and longitude of the destination set in the car navigation section 1, and "way point information" is information on latitude and longitude of a way point in the guidance route to the destination set in the car navigation section 1. Moreover, "cumulative traveling distance information" is information on a cumulative traveling distance of the vehicle C from a time point of setup (vehicle information registration work performed by a dealer or the like) of the DSRC section 3, until now.

"Taste genre table version information" is information indicating a version of a taste genre table distributed from the provider specified by "provider code". The taste genre table is a table in which taste data numbers (numbers for specifying genre items) for the genre items (for example, shopping, gourmet, living and the like) which are previously prepared by the provider, genre name display text information, and the like are listed, and is used when a genre suiting the user's taste is set.

"Taste genre data" is information indicating the genre item set as the genre suiting the user's taste. The taste genre data is represented by the taste data numbers defined in the taste genre table, and can include up to 96 items.

"Past drop-in place information" is latitude and longitude information and time information on a point at which the vehicle C has stopped in the past (that is, the vehicle-mounted device 10 has been powered ON or OFF).

The member information is various information of which the provider is notified by the user who is a member of the distribution service. The member information includes, for example, comment information on the distributed content information, a copy of details information on an ID 40 to be described later (information on benefits such as coupons given to the member, and the like) which is included in the distributed content information, and the like.

The reception/reproduction history information is information configured with a information code (received information code) of the content information distributed from the center apparatus 30, and a reproduction identification flag indicating whether or not the content information has been reproduced ("1" indicating that the reproduction has been performed, or "0" indicating that the reproduction has not been performed).

The speech output unit 1g is configured to include a speech processing unit, a D/A converter, an amplifier, a loudspeaker and the like. The speech output unit 1g converts speech data indicated by the control section 4, into an analog signal through the D/A converter, and performs speech output through the loudspeaker. Moreover, the speech output unit 1g generates a synthesized speech signal through the speech processing unit, based on phonographic character string data indicated by the control section 4, and performs speech output through the loudspeaker.

The communication module 2 includes antennas for optical communication, for FM communication, and for 2.4 GHz electric wave communication, respectively, and performs the optical communication, the FM communication, and the electric wave communication with a communication center. The communication module receives traffic jam information, road traffic information and the like from the communication center, and outputs the information to the control section 4. The communication center can include a VICS center or the like. However, the communication center is not limited thereto, and moreover, the information received from the communication center is not limited to the traffic jam information and the road traffic information.

It should be noted that, in addition, the communication module 2 can also acquire information on the Internet and the like by using communication means other than the DSRC, such as WiMax (Worldwide Interoperability for Microwave Access).

The DSRC section 3 performs the process for using the ETC through the DSRC, a communication process for receiving the content information from the center apparatus 30, and the like.

As shown in FIG. 3, the DSRC section 3 is configured to include the DSRC control unit 3a, a communication unit 3b, the storage unit 3c, an ETC processing unit 3e, and an IC card I/F 3f.

The DSRC control unit 3a is configured with a CPU, a RAM and the like, and controls operations of the respective units of the DSRC section 3 in cooperation with a control program stored in the storage unit 3c.

For example, when settlement through the ETC is performed, the communication operation of the communication unit 3b is controlled to transmit and receive settlement information to and from an ETC base station (a wireless base station provided near an ETC gate or the like, for performing the ETC settlement). Moreover, a process for writing the settlement information is performed by the ETC processing unit 3e.

Moreover, when the content information is received from the center apparatus 30, according to an instruction from the control section 4, information stored in an uplink information storage area M of the storage unit 3c is transmitted to the roadside apparatus 20 by the communication unit 3b. On the other hand, if the content information is received by the communication unit 3b via the roadside apparatus 20, the content information is outputted to the control section 4.

The communication unit 3b includes, for example, an antenna placed to be fixed near a windshield on a dashboard of the vehicle C, and transmits and receives the DSRC electric wave to and from the roadside apparatus 20, the ETC base station and the like, via this antenna.

The storage unit 3c is configured with a nonvolatile memory or the like. The storage unit 3c stores the control program executed by the DSRC control unit 3a, and the like.

Moreover, the uplink information storage area M is provided in the storage unit 3c. The uplink information storage area M is a store area provided exclusively for providing information to the center apparatus 30, and in addition to the uplink information shown in FIG. 4, characteristics information (not shown) on the vehicle-mounted device 10 is stored.

The characteristics information refers to information regarding device characteristics of the vehicle-mounted device 10. The characteristics information includes information on the vehicle-mounted device ID of the vehicle-mounted device 10, a language which can be supported by the vehicle-mounted device 10, a geographical coordinate system of a map, a copyright management technique which can be supported by the vehicle-mounted device 10, a resolution of a display of the display unit 1e, support of SVG (Scalable Vector Graphics), a storage capacity up to which the content information can be accumulated, and the like. It should be noted that the vehicle-mounted device ID is identification information unique to each vehicle-mounted device 10.

A data format when the uplink information is transmitted to the center apparatus 30 is predefined, and the uplink information stored in the storage unit if is written in the uplink information storage area M according to the predefined data format at a predetermined timing. More particularly, five tag areas are provided in the uplink information storage area M, the fundamental information is written in tag 1, the past drop-in place information is written in tags 2 to 3, and the reception/reproduction history information is written in tags 4 to 5. When the uplink information is transmitted to the center apparatus 30, a tag number for identifying the tag is assigned to each information written in tags 1 to 5, and the information is transmitted.

FIG. 5 shows an example of the data format of a portion of "fundamental information" which is written in tag 1.

The ETC processing unit 3e reads and writes the settlement information and the like, from and to a credit card, a debit card or the like with an IC, which is inserted to and removed from the IC card I/F 3f.

The IC card I/F 3f includes a slot for the credit card or the like, and serves as an intermediary for communication of the information between the IC of the credit card or the like which is inserted into this slot, and the ETC processing unit 3e.

The I/F 5 outputs an input signal from the engine switch key 6 for switching ON/OFF of an engine of the own vehicle, to the control section 4.

Next, the center apparatus 30 will be described.

The center apparatus 30 stores the content information, and distributes the content information to the vehicle-mounted device 10.

It should be noted that, while FIG. 1 shows only one center apparatus 30, there are the plurality of providers which distribute the content information, and the center apparatus 30 is provided for each provider. Moreover, the roadside apparatus 20 may include some or all of functions as the center apparatus 30 to be described below.

Figures 6, 7:
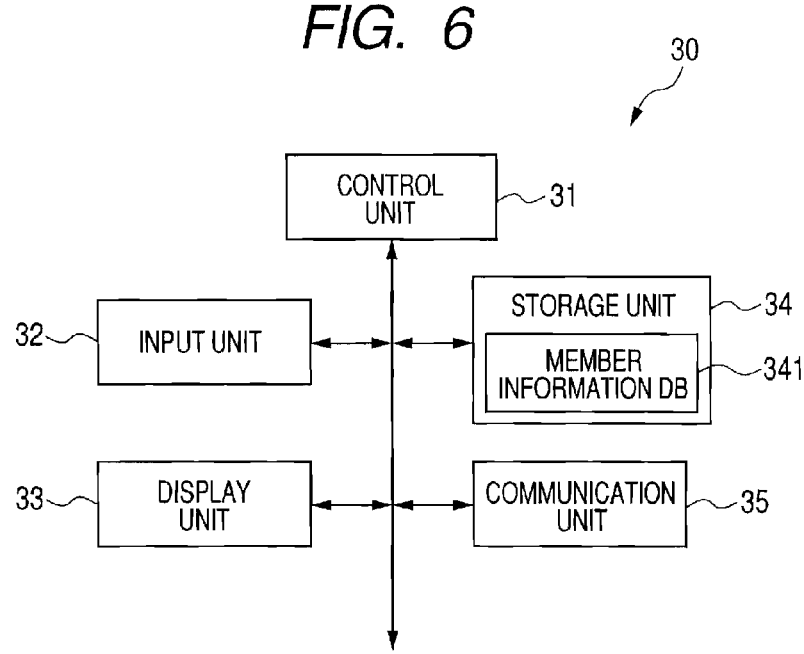
FIG. 6 is a block diagram showing a functional configuration of the center apparatus of FIG. 1.
FIG. 7 is a diagram showing a data storage example of a member information DB of FIG. 6.

FIG. 6 shows a functional configuration of the center apparatus 30.

As shown in FIG. 6, the center apparatus 30 is configured to include a control unit 31, an input unit 32, a display unit 33, a storage unit 34, and a communication unit 35.

The control unit 31 is configured with a CPU, a RAM and the like, and executes various calculations in cooperation with a control program stored in the storage unit 34, and in addition, controls the respective units in a centralized manner.

For example, the control unit 31 reads out and organizes the content information saved in the storage unit 34, and performs distribution control for the organized content information. It should be noted that the organization refers to selection of the content information to be distributed, based on the uplink information, and the like.

The input unit 32 includes a keyboard and the like to accept an operation input, and outputs an operation signal depending on the operation input, to the control unit 31.

The display unit 33 includes a display, and displays various screens on the display according to display control by the control unit 31.

The storage unit 34 is configured with a nonvolatile memory, a hard disk and the like, and stores a program executed by the control unit 31, and in addition, various data required for executing the program.

Moreover, as shown in FIG. 7, the storage unit stores a member information DB (Data Base) 341. When the user of the vehicle-mounted device 10 subscribes to the provider for becoming a member of the distribution service of the content information, member registration is performed. The member information DB 341 is a database (member registration database) which stores member registration information, such as personal information such as a name and an address of the user who has registered as the member, the user's own vehicle-mounted device ID, and points acquired by the member.

Moreover, the storage unit 34 stores the provider code which is individually assigned to the provider of the content information, and the content information to be distributed. The content information is classified into each genre item defined by a taste genre data table distributed to the vehicle-mounted device 10.

FIG. 8 shows an example of a data format of the content information distributed from the center apparatus 30.

As shown in FIG. 8, in the content information, information classified by a major section number (ID) is configured with several storable files, and the information on the ID required depending on the substance of the content to be provided is stored.

Here, in the information classified by the ID, major information required in the present embodiment will be described.

"Composition ID information" classified into ID 00 is information on the ID included in the content information. In other words, the composition ID information is information indicating which ID of the content information the information is stored in.

"Provider information" classified into ID 01 is information regarding the provider which distributes the content, and includes, for example, "provider code", "provider name display text" and the like of the provider which provides the content.

"Content information" classified into ID 02 and ID 03 is information indicating an attribute of the content, and includes, for example, "information provider company code" and "information provider company name display text" of an information provider company which provides the content, "information code" which is identification information for specifying the content, "information title display text" indicating the substance of the content, "taste data category information" indicating a category of the content, and the like. It should be noted that the category of "taste data category information" is synonymous with the genre item defined by the above described taste genre table, and "taste data category information" is described by the above described taste data number.

"Content information" classified into ID 03 includes "immediate reproduction/accumulation code" as an identifier representing whether the content is accumulated as a content which is also usable out of the intercommunication area Z, or is immediately reproduced after reception is completed.

"Expiration time of validity information" classified into ID 04 is information indicating a expiration time of the content, and includes "start year/month/day/hour/minute/second", "end year/month/day/hour/minute/second", and the like.

"Object point information" classified into ID 10 includes information regarding a point where a service guided by the content is provided (referred to as "Object point"), and actual data of the content. "Object point information" includes "Object point coordinate information" indicating latitude and longitude of the object point, "service name display text" indicating names of the service provided at the object point and the store, "display character data" which is text information for describing the service, "display image data" for displaying a screen of the service guide, "phonographic character string data" and "compressed speech data" for speech guidance of the service, "URL information" indicating an address of a storage location of a Web page which provides information related to the substance of the content, "affiliated parking lot information" indicating an affiliated parking lot other than the object point, "icon display image data" at the time of displaying the object point on the map screen, and the like.

"Transition information" classified into ID 30 is information indicating a content which is reproducible next to the content (reproduction transition destination). According to "transition information", reproduction transition to eight branches is enabled, and "transition information" includes "next reproduced information code 1" to "next reproduced information code 8" indicating the information code (ID 02) of the next reproducible content. It should be noted that if screen transition destinations are less than eight, the information code is not stored in "next reproduced information code" which exceeds the number of the transition destinations.

"Details information" classified into ID 40 is details information regarding the substance of the content (an image, speech and the like) of ID 10. "Details information" includes "Details information data" including information indicating the substance of the content of ID 10 (for example, a code indicating that the content is coupon information or bargain information, and the like), "details information display text" which is text information indicating the substance of the content of ID 10, "details information phonographic character string data" for performing speech output of the substance of the content of ID 10, and the like.

A plurality of pieces of the content information are distributed from the center apparatus 30 to the vehicle-mounted device 10. The plurality of pieces of the content information to be distributed are hierarchical, and in the vehicle-mounted device 10, the content information can be reproduced by sequentially causing screen transition according to a hierarchical structure defined by the transition information in ID 30.

Next, an operation for the member registration cancellation of the distribution service in the information distribution system 100 will be described.

Figure 9:
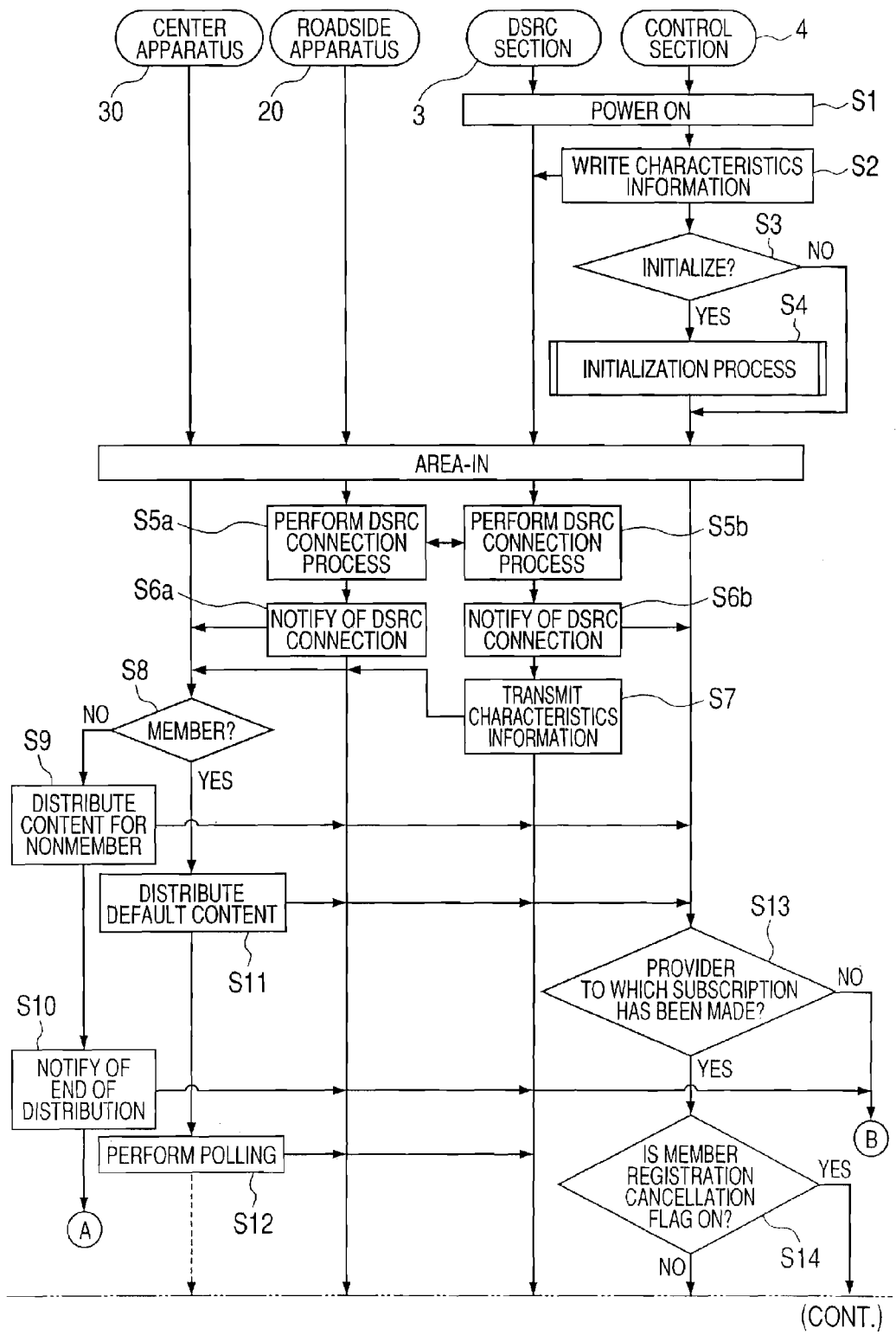
FIG. 9 is a diagram explaining a process flow among the respective apparatuses when the content information is distributed in the information distribution system of a first embodiment.

FIG. 9 is a flowchart explaining a process flow in the center apparatus 30, the roadside apparatus 20, as well as the DSRC section 3 and the control section 4 of the vehicle-mounted device 10, when the content information is distributed in the first embodiment.

As shown in FIG. 9, when the engine of the vehicle C is started and the vehicle-mounted device 10 is powered on (step S1), the control section 4 generates the characteristics information on the vehicle-mounted device 10, and writes the characteristics information in the uplink information storage area M of the storage unit 3c (step S2). The characteristics information is acquired by inquiring of the respective units such as the display unit 1e about items which have been previously decided with the center apparatus 30, by the control section 4, or is acquired by reading out the information which has been previously stored in the storage unit 1f, and the like. In addition, the control section 4 codes the acquired information, and writes the code in a corresponding area in the uplink information storage area M. It should be noted that, actually, control information for instructing to write is outputted to the DSRC control unit 3a, and this DSRC control unit 3a performs the writing into the uplink information storage area M.

In the vehicle-mounted device 10, if an instruction to initialize the car navigation section 1 is inputted through the input unit 1d from a menu screen displayed on the display unit 1e (step S3; YES), the control section 4 executes an initialization process (step S4).

Figure 10:
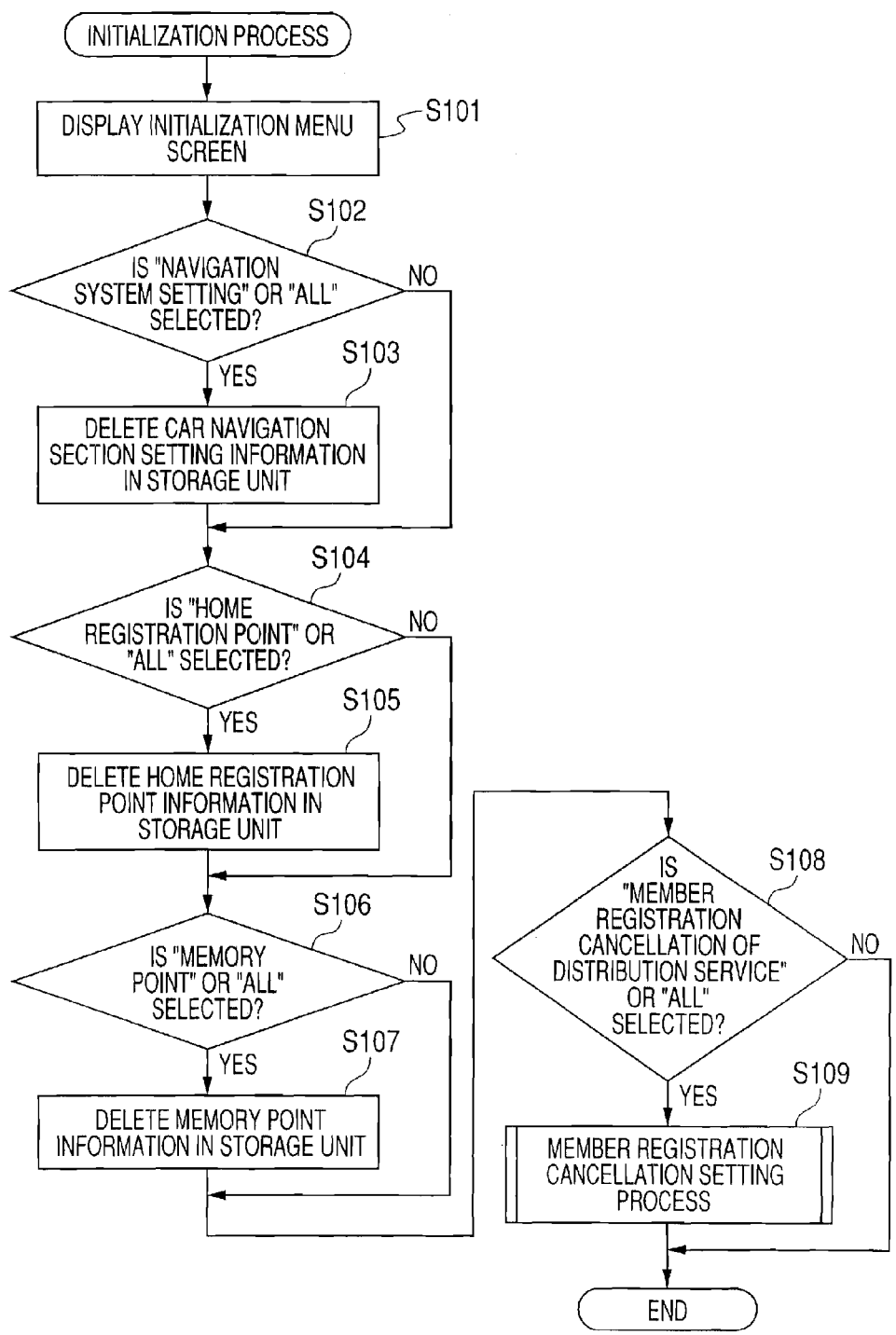
FIG. 10 is a flowchart showing an initialization process executed in step S4 of FIG. 9.

FIG. 10 is a flowchart showing the initialization process executed by the control section 4 in step S4 of FIG. 9.

If the instruction to initialize the car navigation section 1 is inputted through the input unit 1d from the menu screen displayed on the display unit 1e, the control section 4 displays an initialization menu screen (not shown) on the display unit 1e (step S101). On the initialization menu screen, "navigation system setting", "home registration point", "memory point", "member registration cancellation of distribution service", and "all" are displayed as selectable items so that the user can select the item to be initialized, from the displayed selectable items through the input unit 1d.

On the initialization menu screen, if "navigation system setting" or "all" is selected through the input unit 1d (step S102; YES), the control section 4 deletes the setting information on the car navigation section 1, which is stored in the storage unit if (step S103).

On the initialization menu screen, if "home registration point" or "all" is selected through the input unit 1d (step S104; YES), the control section 4 deletes home registration spot information stored in the storage unit if (step S105).

On the initialization menu screen, if "memory point" or "all" is selected through the input unit 1d (step S106; YES), the control section 4 deletes memory point information stored in the storage unit 1f (step S107).

On the initialization menu screen, if "member registration cancellation of distribution service" or "all" is selected through the input unit 1d (step S108; YES), the control section 4 executes a member registration cancellation setting process shown in FIG. 11 (step S109), and terminates this process.

Figure 11:
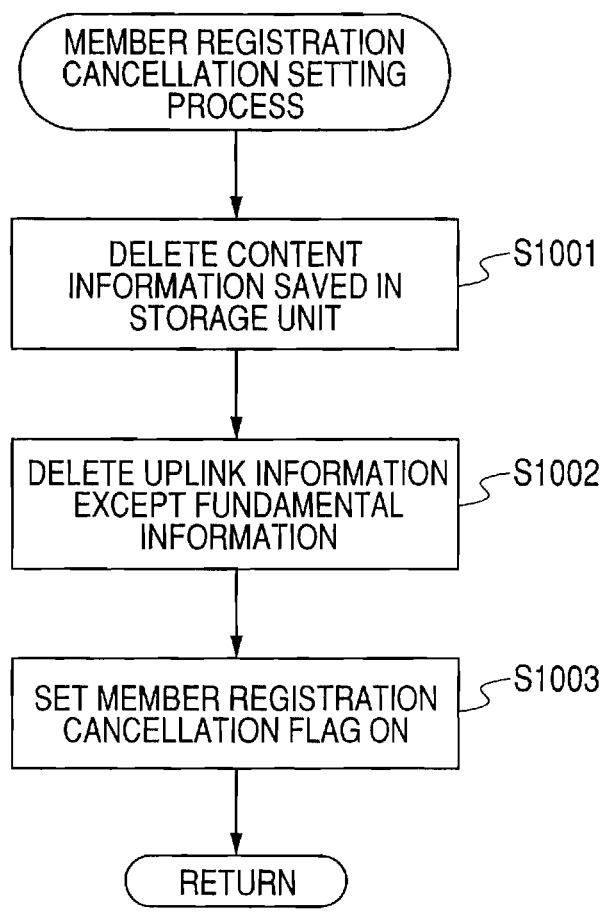
FIG. 11 is a flowchart showing a member registration cancellation setting process executed in step S109 of FIG. 10.

FIG. 11 shows the member registration cancellation setting process executed by the control section 4 of the vehicle-mounted device 10 in step S109.

In the member registration cancellation setting process, the control section 4 first deletes the content information stored in the storage unit 1f (the content information which has been received from the center apparatus 30 and saved) (step S1001). Next, the control section 4 deletes the uplink information except the fundamental information stored in the storage unit if (step S1002). Then, the control section 4 sets ON the member registration cancellation flag in the member registration cancellation flag area of the storage unit 1*f* (step S1003), and terminates this process. The member registration cancellation flag ON becomes member registration cancellation information.

It should be noted that while the setting of the member registration cancellation of the distribution service may be performed for all the registered providers as described above, the setting may be able to be performed for each provider. If a configuration is employed in which the member registration cancellation can be performed for each provider, for example, when the member registration cancellation setting process is started, the control section 4 displays a list of the providers for which the member registration of the distribution service has been performed (that is, the providers whose provider codes have been registered in the uplink information in the storage unit 1*f*) on the display unit 1*e* so that the user can select the provider for which the member registration cancellation is performed, through the input unit 1*d*. In addition, in step S1001 of FIG. 11, the content information having the provider code of the provider selected through the input unit 1*d* is deleted from the storage unit 1*f*, and in step S1002, the uplink information on the selected provider is deleted from the storage unit 1*f*. Then, in step S1003, the member registration cancellation flag is set ON in a manner corresponding to the provider code of the selected provider.

Subsequently, when the vehicle C starts to travel and enters the intercommunication area Z of the roadside apparatus 20 (area-in), the roadside apparatus 20 detects the vehicle C, and starts a connection process with the DSRC section 3 of the vehicle-mounted device 10 through DSRC communication (steps S5*a* and S5*b* of FIG. 9). In other words, when the DSRC electric wave is transmitted and a response from the vehicle-mounted device 10 is acquired, a communication channel is established. When the communication channel is established, the roadside apparatus 20 transmits notification information indicating that the connection is completed, to the center apparatus 30 (step S6*a*). On the other hand, the DSRC section 3 of the vehicle-mounted device 10 outputs the notification information indicating that the connection is completed, to the control section 4 (step S6*b*).

Next, the DSRC section 3 transmits the characteristics information written in the uplink information storage area M, to the roadside apparatus (step S7). The characteristics information is transmitted to the center apparatus 30 via the roadside apparatus 20.

In the center apparatus 30, when the characteristics information is received by the communication unit 35, the control unit 31 determines whether or not the user of the vehicle-mounted device 10 is the member of the distribution service, based on the vehicle-mounted device ID included in the received characteristics information (step S8).

If the control unit 31 of the center apparatus 30 determines that, in the vehicle-mounted device IDs of all the members of the distribution service, which are registered in the member information DB 341, no vehicle-mounted device ID coincides with the received vehicle-mounted device ID, and that the user of the vehicle-mounted device 10 is a nonmember (step S8; NO), the control unit 31 of the center apparatus 30 reads out content information for the nonmember from the storage unit 34, and distributes the content information for the nonmember by the communication unit 35 via the roadside apparatus 20 to the vehicle-mounted device 10 (step S9). When the distribution is ended, the control unit 31 of the center apparatus 30 generates message information for notifying of the end of the distribution, transmits the message information to the vehicle-mounted device 10 (step S10), and terminates the process in the center apparatus 30. The content information for the nonmember is, for example, information having substance for the public, such as public advertising information such as train delay information and tax notice information.

On the other hand, if the vehicle-mounted device ID which coincides with the received vehicle-mounted device ID has been registered in the member information DB 341, and it is determined that the user of the vehicle-mounted device 10 is the member (step S8; YES), the control unit 31 of the center apparatus 30 distributes default content information for the member by the communication unit 35 via the roadside apparatus 20 to the vehicle-mounted device 10 (step S11). The default content information for the member is, for example, welcome screen information indicating start of the distribution of the content information, or the like.

Moreover, the control unit 31 periodically performs polling to the vehicle-mounted device 10 (steps S12 and S17), and requests the transmission of the uplink information written in the uplink information storage area M.

When the content information is received via the roadside apparatus 20, the control section 4 of the vehicle-mounted device 10 collates the provider code included in the received content information with the provider code included in the uplink information stored in the storage unit if, and thereby determines whether or not the provider which has distributed the received content information is the provider to which the subscription has been made (step S13). If it is determined that the provider which has distributed the received content information is not the provider to which the subscription has been made (step S13; NO), the control section 4 moves to a process in step S30, and in response to reception of the message information for notifying of the end of the distribution, from the center apparatus 30, checks whether or not all the content information is complete, whether or not all data in the received content information is normal, and the like (step S30), and saves the received content information in the storage unit if (step S31). Then, the process in the control section 4 is terminated.

On the other hand, if it is determined that the provider which has distributed the received content information is the provider to which the subscription has been made (step S13; YES), the control section 4 determines whether or not the member registration cancellation flag is set ON in the member registration cancellation flag area of the storage unit 1*f*. If it is determined that the member registration cancellation flag is not set ON (step S14; NO), the control section 4 moves to a process in step S16.

If it is determined that the member registration cancellation flag is set ON (step S14; YES), the control section 4 writes a code indicating the member registration cancellation, in "fundamental information" in the uplink information corresponding to the provider code of the provider, which is stored in the storage unit if (step S15), and moves to the process in step S16. Specifically, "provider code" in "fundamental information" is overwritten with the code indicating the registration cancellation (for example, each digit of the provider code is set to 0, based on a decision with each provider, or the like). Alternatively, 0 is written in "taste genre table version information", and also, 0 is written in the 96 items of "taste genre data". It should be noted that information indicating the member registration cancellation is not limited to the above code indicating the member registration cancellation, and for example, a flag or the like may be used and a flag indicating the member registration cancellation may be written in the uplink information, or "member registration cancellation" may be written in the member information in the uplink information. Moreover, the member registration cancellation may be indicated by writing 0 in only one of "taste genre table version information" and "taste genre data".

In step S16, the uplink information corresponding to the provider code of the provider is read out from the storage unit 1f, and written in the uplink information storage area M (step S16).

When the uplink information is written in the uplink information storage area M by the control section 4, the DSRC section 3 transmits the uplink information stored in the uplink information storage area M, via the roadside apparatus 20 to the center apparatus 30, in response to the polling from the center apparatus 30 (step S18).

In the center apparatus 30, when the uplink information is received via the communication unit 35, the control unit 31 temporarily saves the received uplink information (step S19), and also transmits an uplink information open request by the communication unit 35 via the roadside apparatus 20 to the vehicle-mounted device 10 (step S20).

When the control section 4 receives the uplink information open request transmitted from the center apparatus 30 via the roadside apparatus 20, the control section 4 determines whether or not the member registration cancellation flag is set ON in the member registration cancellation flag area of the storage unit if (step S21). If it is determined that the member registration cancellation flag is set ON in the member registration cancellation flag area of the storage unit 1f (step S21; YES), the control section 4 performs a process for deleting "fundamental information" in the uplink information having the provider code of the provider, which is stored in the storage unit if (step S22), sets OFF the member registration cancellation flag (step S23), and terminates the process in the control section 4. If it is determined that the member registration cancellation flag is not set ON in the member registration cancellation flag area of the storage unit if (step S21; NO), the control section 4 waits for the reception of the content information, and moves to the process in step S30.

In the control unit 31 of the center apparatus 30, after the uplink information open request is transmitted, it is determined whether or not the received uplink information coincides with a predefined member registration cancellation condition (step S24). Specifically, if "provider code" in "fundamental information" is the code indicating the registration cancellation (for example, each digit of the provider code is set to 0, or the like), or "taste genre table version" and the 96 items of "taste genre data" are 0, it is determined that the received uplink information coincides with the member registration cancellation condition.

If it is determined that the received uplink information coincides with the member registration cancellation condition (step S24; YES), the control unit 31 deletes a record of the member registration information corresponding to the vehicle-mounted device ID coinciding with the vehicle-mounted device ID of a sender of the uplink information, which is stored in the member information DB 341, from the member information DB 341 (step S25), reads out content information for notifying of the member registration cancellation, from the storage unit 34 (step S26), and distributes the content information by the communication unit 35 via the roadside apparatus 20 to the vehicle-mounted device 10 (step S28).

If it is determined that the received uplink information does not coincide with the member registration cancellation condition (step S24; NO), the control unit 31 organizes the content information to be distributed, based on the uplink information received from the vehicle-mounted device 10 (step S27), and distributes the content information by the communication unit 35 via the roadside apparatus 20 to the vehicle-mounted device 10 (step S28).

In step S27, with reference to the taste genre data or the like in the received uplink information, the content information or the like which is classified into the genre item suiting the user's taste, in the content information stored in the storage unit 34, is selected as a content to be distributed, and corresponding content information is read out from the storage unit 34 and is distributed to the vehicle-mounted device 10.

When the distribution of the content information is ended, the control unit 31 of the center apparatus 30 generates the message information for notifying of the end of the distribution, and transmits the message information by the communication unit 35 via the roadside apparatus 20 to the vehicle-mounted device 10 (step S29).

In the vehicle-mounted device 10, when the content information distributed from the center apparatus 30 and the notification of the end of the distribution are received via the roadside apparatus 20, the control section 4 of the vehicle-mounted device 10 checks whether or not all the content information is complete, whether or not all data in the received content information is normal, and the like (step S30), saves the received content information in the storage unit 1f, and also stores a reception history in the storage unit if (step S31). In the storage of the reception history, specifically, the received information code in the received content information is written in the reception/reproduction history information in the uplink information on the provider code, which is stored in the storage unit 1f.

If the communication with the roadside apparatus is stopped for a certain period of time or more because the vehicle-mounted device 10 moves out of the intercommunication area Z (area-out), a series of processes for the information distribution is terminated.

As described above, according to the first embodiment, on the initialization menu screen displayed on the display unit 1e of the vehicle-mounted device 10, if "member registration cancellation of distribution service" or "all" is selected through the input unit 1d, and an instruction to perform the member registration cancellation of the distribution service is issued, the control section 4 executes the member registration cancellation setting process, deletes the content information stored in the storage unit 1f, deletes the uplink information except the fundamental information, and sets ON the member registration cancellation flag. Moreover, when the communication with the center apparatus 30 is established, the control section 4 determines whether or not the member registration cancellation flag is set ON, and if the member registration cancellation flag is set ON, the control section 4 writes the code indicating the member registration cancellation, in the fundamental information in the uplink information, and transmits the uplink information to the center apparatus 30. When the center apparatus 30 receives the uplink information from the vehicle-mounted device 10, the center apparatus 30 determines whether or not the code indicating the member registration cancellation is included in the fundamental information, and if the center apparatus 30 determines that the code indicating the member registration cancellation is included, the center apparatus 30 deletes the member registration information on the record having the vehicle-mounted device ID of the sender vehicle-mounted device 10, from the member information DB 341, and transmits the content information for notifying of the member registration cancellation, to the vehicle-mounted device 10.

Therefore, the user inputs the instruction to perform the member registration cancellation of the distribution service, to the vehicle-mounted device 10, by operating the initialization menu screen in the vehicle-mounted device 10, or the like, and thereby can delete the content information and the uplink information which are stored in the storage unit 1f, as well as the personal information registered in the center apparatus 30, and the like. Consequently, for example, in the case where a vehicle on which the vehicle-mounted device 10 is mounted is sold to a third party, or the like, the personal information can be prevented from remaining in the vehicle-mounted device or the center apparatus.

<Second Embodiment>

Hereafter, a second embodiment according to the present invention will be described.

The configurations of the respective apparatuses, and data configurations of the content information and the uplink information in the second embodiment are approximately similar to those of the first embodiment, and thus the descriptions thereof are cited, and operations of the second embodiment will be described below.

Figure 12:
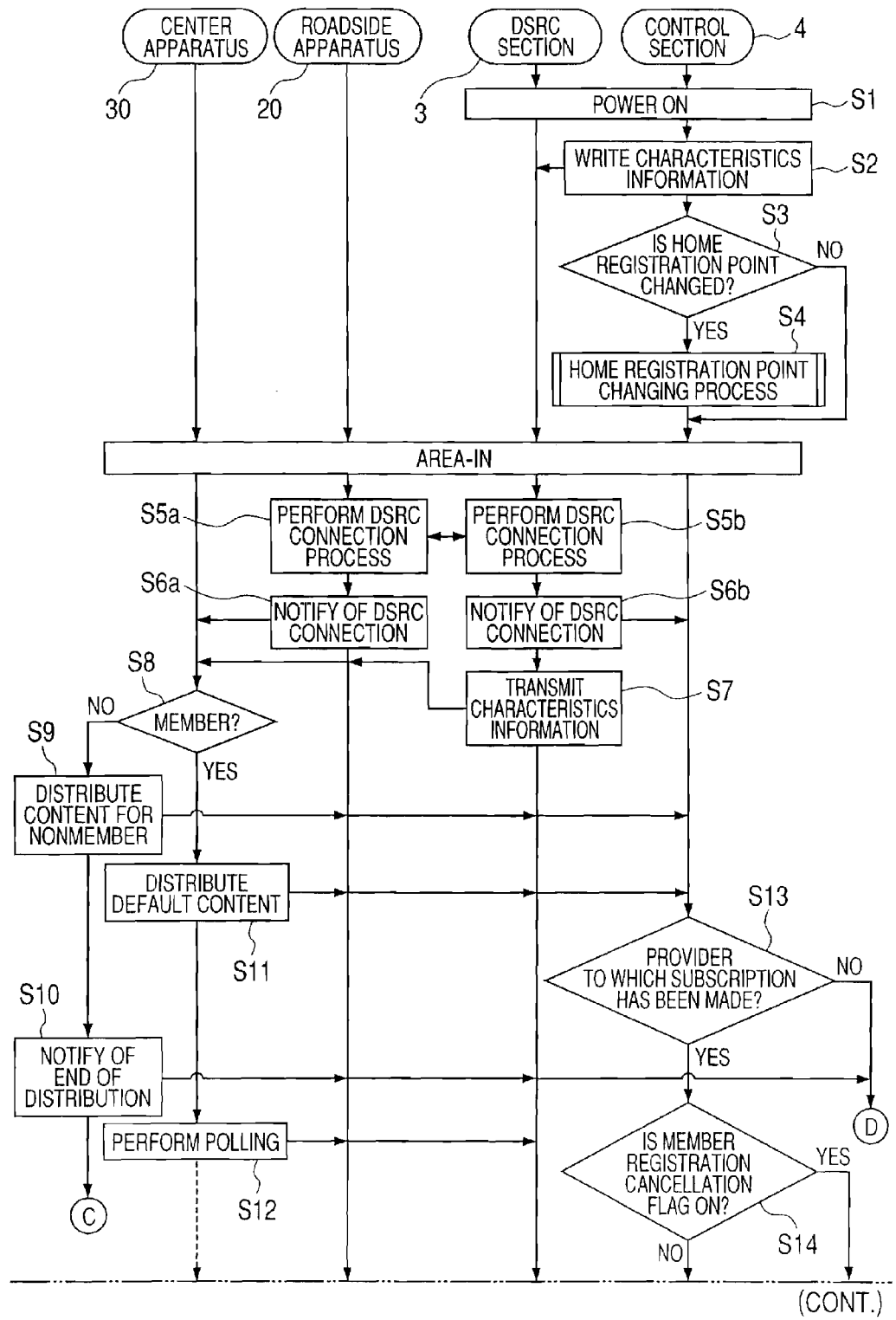
FIG. 12 is a diagram explaining a process flow among the respective apparatuses when the content information is distributed in the information distribution system of a second embodiment.

FIG. 12 is a flowchart explaining a process flow in the center apparatus 30, the roadside apparatus 20, as well as the DSRC section 3 and the control section 4 of the vehicle-mounted device 10, when the content information is distributed in the second embodiment.

As shown in FIG. 12, in the second embodiment, only the processes in steps S3 and S4, which are executed by the control section 4, are different from those of the first embodiment.

In FIG. 12, when the engine of the vehicle C is started and the vehicle-mounted device 10 is powered on (step S1), the control section 4 generates the characteristics information on the vehicle-mounted device 10, and writes the characteristics information in the uplink information storage area M of the storage unit 3c (step S2).

In the vehicle-mounted device 10, if an instruction to change the home registration spot of the car navigation section 1 is inputted through the input unit 1d according to the menu screen displayed on the display unit 1e and the like (step S3; YES), a home registration spot changing process is executed by the control section 4 (step S4).

FIG. 13 is a flowchart showing the home registration spot changing process executed by the control section 4 in step S4 of FIG. 12.

If the instruction to change the home registration spot is inputted through the input unit 1d, the control section 4 displays an input screen (a keyboard screen or the like) for inputting a home address or the like, on the display unit 1e, and accepts an input of a new home registration spot (step S201). When the home registration spot is inputted from the input screen, the control section 4 overwrites the home registration spot information stored in the storage unit 1f, with inputted spot information, and changes the home registration spot information (step S202). It should be noted that, in step S201, the map screen or the like may be displayed, and a spot indicated through the input unit 1d may be inputted as a spot to be registered as a home.

Next, the control section 4 displays an inquiry screen (not shown) for inquiring of the user whether or not to cancel the member registration, on the display unit 1e (step S203). On this inquiry screen, for example, a message such as "Do you cancel the member registration of the distribution service?", a "YES" button for issuing the instruction to perform the member registration cancellation, a "NO" button for issuing an instruction not to perform the member registration cancellation, and the like are displayed.

If the instruction not to perform the member registration cancellation of the distribution service is inputted by depressing the "NO" button through the input unit 1d, or the like (step S204; NO), the control section 4 terminates this process.

If the instruction to perform the member registration cancellation of the distribution service is issued by depressing the "YES" button through the input unit 1d, or the like (step S204; YES), the control section 4 executes the member registration cancellation setting process (step S205), and terminates this process. Since the member registration cancellation setting process executed in step S205 is similar to that described by using FIG. 11 in the first embodiment, a description thereof is omitted.

When the vehicle C starts to travel and enters the intercommunication area Z of the roadside apparatus 20 (area-in), the roadside apparatus 20 detects the vehicle C, and starts the connection process with the DSRC section 3 of the vehicle-mounted device 10 through the DSRC communication (steps S5a and S5b of FIG. 12). Since the processes from the area-in to the area-out are similar to those described in the first embodiment, descriptions thereof are omitted.

As described above, according to the second embodiment, if the instruction to change the home registration spot is inputted through the input unit 1d according to the menu screen displayed on the display unit 1e of the vehicle-mounted device 10, and the new home registration spot information is inputted through the input unit 1d, the control section 4 changes the home registration spot information stored in the storage unit 1f, to the newly inputted home registration spot information, and also displays the screen for inquiring whether or not to cancel the member registration of the distribution service, on the display unit 1e. If the instruction to perform the member registration cancellation of the distribution service is inputted, the control section 4 executes the member registration cancellation setting process, deletes the content information and the uplink information except the fundamental information, which are stored in the storage unit 1f, and sets ON the member registration cancellation flag. Moreover, when the communication with the center apparatus 30 is established, the control section 4 determines whether or not the member registration cancellation flag is set ON, and if the member registration cancellation flag is set ON, the control section 4 writes the code indicating the member registration cancellation, in the fundamental information in the uplink information, and transmits the uplink information to the center apparatus 30. When the center apparatus 30 receives the uplink information from the vehicle-mounted device 10, the center apparatus 30 determines whether or not the code indicating the member registration cancellation is included in the fundamental information, and if the center apparatus 30 determines that the code indicating the member registration cancellation is included, the center apparatus 30 deletes the member registration information on the record having the vehicle-mounted device ID of the sender vehicle-mounted device 10, from the member information DB 341, and transmits the content information for notifying of the member registration cancellation, to the vehicle-mounted device 10.

Therefore, when the user of the vehicle-mounted device 10 inputs the change of the home registration spot through the input unit 1d, the user of the vehicle-mounted device 10 can also input the instruction to perform the member registration cancellation of the distribution service, and can delete the content information and the uplink information which are stored in the storage unit 1f, as well as the personal information registered in the center apparatus 30, and the like. Consequently, for example, in the case where the vehicle on which the vehicle-mounted device 10 is mounted has been replaced, or the like, the distribution of the content information set for a previous user can be prevented, or the personal information on the previous user can be prevented from remaining in the vehicle-mounted device.

<Third Embodiment>

Hereafter, a third embodiment according to the present invention will be described.

The configurations of the respective apparatuses, and the data configurations of the content information and the uplink information in the third embodiment are approximately similar to those of the first embodiment, and thus the descriptions thereof are cited, and operations of the third embodiment will be described below.

Figure 14:
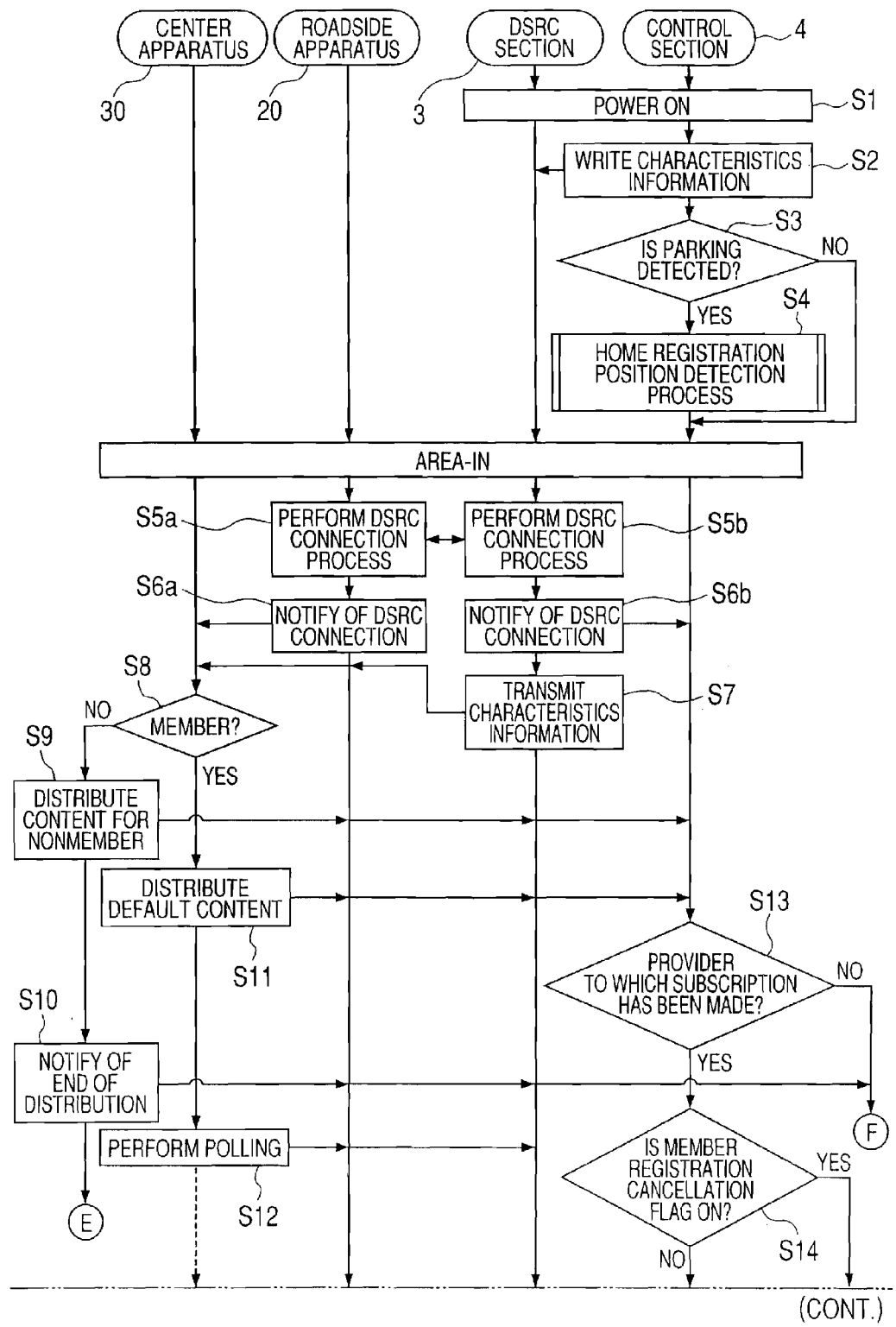
FIG. 14 is a diagram explaining a process flow among the respective apparatuses when the content information is distributed in the information distribution system of third and fourth embodiments.

FIG. 14 is a flowchart explaining a process flow in the center apparatus 30, the roadside apparatus 20, as well as the DSRC section 3 and the control section 4 of the vehicle-mounted device 10, when the content information is distributed in the third embodiment.

As shown in FIG. 14, in the third embodiment, only the processes in steps S3 and S4, which are executed by the control section 4, are different from those of the first embodiment.

In FIG. 14, when the engine of the vehicle C is started and the vehicle-mounted device 10 is powered on (step S1), the control section 4 generates the characteristics information on the vehicle-mounted device 10, and writes the characteristics information in the uplink information storage area M of the storage unit 3c (step S2).

Subsequently, if the vehicle-mounted device 10 moves, and the signal (OFF signal) indicating that the engine switch key 6 has been turned OFF is detected via the I/F 5, that is, the parking of the vehicle C (own vehicle) is detected (step S3; YES), the control section 4 executes a home registration position detection process (step S4).

Figure 15:
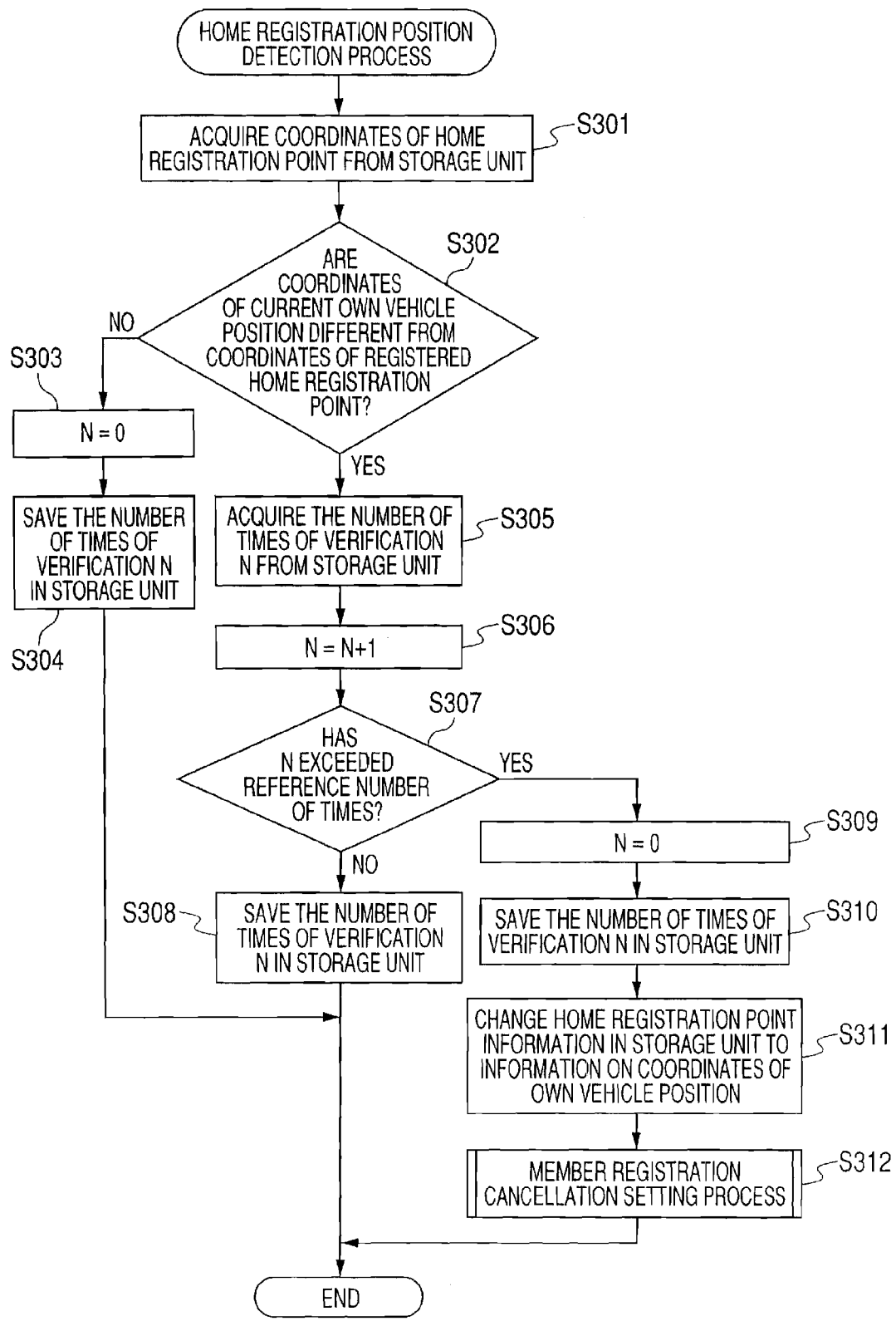
FIG. 15 is a flowchart showing a home registration position detection process executed in step S4 of FIG. 14 in the third embodiment.

FIG. 15 is a flowchart showing the home registration position detection process executed by the control section 4 in step S4 of FIG. 14.

When the parking is detected, the control section 4 reads out the home registration spot information stored in a "home registration spot information" area of the storage unit 1f, and acquires coordinates (latitude/longitude) of the home registration spot (step S301). Next, the control section 4 compares coordinates of the current location of the vehicle C (an own vehicle position) detected by the current location detection unit 1b, with the acquired coordinates of the home registration spot, and determines whether or not both are different from each other (step S302). If it is determined that the coordinates of the home registration spot and the coordinates of the own vehicle position are not different from each other (are the same) (step S302; NO), the control section 4 sets 0 to the number of times of verification N (step S303), saves the number of times of verification N in a predetermined area of the storage unit 1f (step S304), and terminates this process.

As a result of the comparison, if it is determined that the coordinates of the home registration spot and the coordinates of the current own vehicle position are different from each other (step S302; YES), the control section 4 acquires the number of times of verification N from the storage unit 1f (step S305). Next, the control section 4 increments the number of times of verification N by 1 (step S306), and determines whether or not the number of times of verification N has exceeded a predefined reference number of times (step S307). If it is determined that the number of times of verification N has not exceeded the predefined reference number of times (step S307; NO), the control section 4 saves the number of times of verification N in the predetermined area of the storage unit 1f (step S308), and terminates this process.

On the other hand, if it is determined that the number of times of verification N has exceeded the predefined reference number of times (step S307; YES), the control section 4 sets 0 to the number of times of verification N to perform initialization (step S309), and saves the number of times of verification N in the predetermined area of the storage unit if (step S310). Then, the control section 4 changes the home registration spot information stored in the "home registration spot information" area of the storage unit 1f, to information on the coordinates of the current own vehicle position (step S311), executes the member registration cancellation setting process (step S312), and terminates this process.

Since the member registration cancellation setting process executed in step S312 is similar to that described by using FIG. 11 in the first embodiment, a description thereof is omitted.

When the vehicle C starts to travel and enters the intercommunication area Z of the roadside apparatus 20 (area-in), the roadside apparatus 20 detects the vehicle C, and starts the connection process with the DSRC section 3 of the vehicle-mounted device 10 through the DSRC communication (steps S5a and S5b of FIG. 14). Since the processes in the respective apparatuses from the area-in to the area-out are similar to those described in the first embodiment, descriptions thereof are omitted.

As described above, according to the third embodiment, the control section 4 counts the number of times of detection of the parking at a position different from the home registration spot information registered in the storage unit 1f of the vehicle-mounted device 10, as the number of times of verification N, changes the registration of the home registration spot information in the storage unit 1f, to the parking position when the number of times of verification N has exceeded the predefined reference number of times, and also, executes the member registration cancellation setting process, deletes the content information and the uplink information except the fundamental information, which are stored in the storage unit 1f, and sets ON the member registration cancellation flag. Moreover, when the communication with the center apparatus 30 is established, the control section 4 determines whether or not the member registration cancellation flag is set ON, and if the member registration cancellation flag is set ON, the control section 4 writes the code indicating the member registration cancellation, in the fundamental information in the uplink information, and transmits the uplink information to the center apparatus 30. When the center apparatus 30 receives the uplink information from the vehicle-mounted device 10, the center apparatus 30 determines whether or not the code indicating the member registration cancellation is included in the fundamental information, and if the center apparatus 30 determines that the code indicating the member registration cancellation is included, the center apparatus 30 deletes the member registration information on the record having the vehicle-mounted device ID of the sender vehicle-mounted device 10, from the member information DB 341, and transmits the content information for notifying of the member registration cancellation, to the vehicle-mounted device 10.

Therefore, when the number of times of the parking at the position different from the home registration spot information has exceeded the predefined reference number of times, the home registration spot information stored in the storage unit if can be automatically changed to the own vehicle position, and the content information and the uplink information, as well as the personal information registered in the center apparatus 30, and the like can be deleted. Consequently, for example, in the case where the vehicle on which the vehicle-mounted device 10 is mounted has been replaced, or the like, the distribution of the content information set for the previous user can be prevented, or the personal information on the previous user can be prevented from remaining in the vehicle-mounted device.

<Fourth Embodiment>

Hereafter, a fourth embodiment according to the present invention will be described.

In the fourth embodiment, the storage unit 1f stores a parking position coordinate table (not shown). The parking position coordinate table is a table in which coordinates of the parking position in the case where the parking is detected at the position different from the home registration spot information registered in the "home registration spot information" area of the storage unit 1f, and the number of times of the parking at the coordinates, are stored so as to correspond to each other.

The configurations of the other respective apparatuses, and the data configurations of the content information and the uplink information in the fourth embodiment are approximately similar to those of the first embodiment, and thus the descriptions thereof are cited, and operations of the fourth embodiment will be described below.

Figure 16:
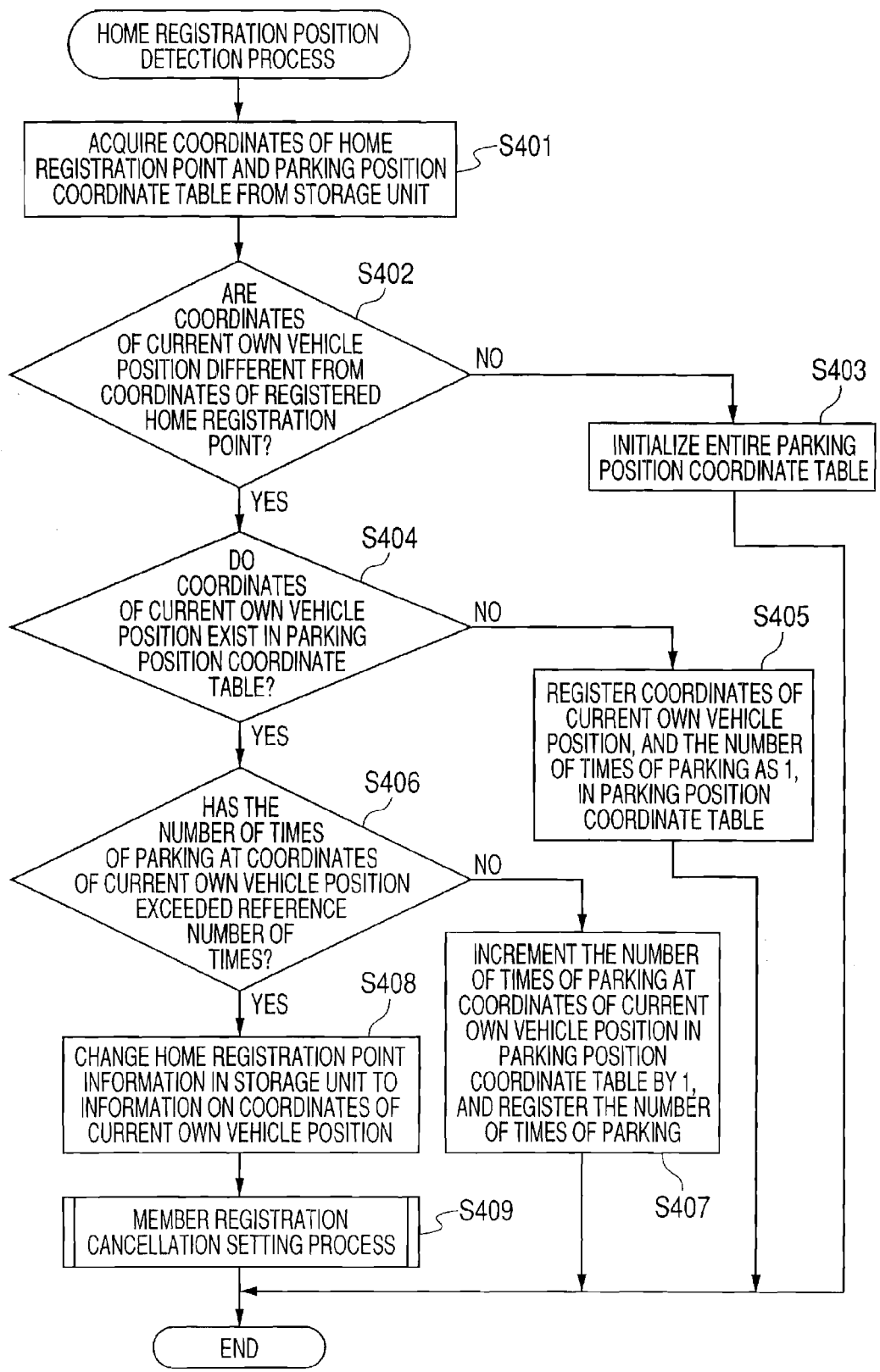
FIG. 16 is a flowchart showing the home registration position detection process executed in step S4 of FIG. 14 in the fourth embodiment.

In the fourth embodiment, a process flow in the center apparatus 30, the roadside apparatus 20, as well as the DSRC section 3 and the control section 4 of the vehicle-mounted device 10, when the content information is distributed, is similar to that shown in FIG. 14, and thus the description thereof is cited. In the present embodiment, since the home registration position detection process executed by the control section 4 in step S4 is different, the process will be described with reference to FIG. 16.

When the parking of the vehicle C is detected, the control section 4 acquires coordinate information on the home registration spot and the parking position coordinate table from the "home registration spot information" area of the storage unit 1f (step S401).

Next, the control section 4 compares coordinates of a present position of the vehicle C (the own vehicle position) detected by the current location detection unit 1b, with the acquired coordinates of the home registration spot, and determines whether or not both are different from each other (step S402). If it is determined that the coordinates of the home registration spot and the coordinates of the own vehicle position are not different from each other (are the same) (step S402; NO), the control section 4 initializes the parking position coordinate table in the storage unit 1f (step S403), and terminates this process.

As a result of the comparison, if it is determined that the coordinates of the home registration spot and the coordinates of the present position are different from each other (step S402; YES), the control section 4 determines whether or not the coordinates of the current own vehicle position exist in the acquired parking position coordinate table (step S404). If it is determined that the coordinates of the current own vehicle position do not exist in the acquired parking position coordinate table (step S404; NO), the control section 4 registers the coordinates of the current own vehicle position, and the number of times of the parking as 1, in the parking position coordinate table (step S405), and terminates this process.

If it is determined that the coordinates of the current own vehicle position exist in the acquired parking position coordinate table (step S404; YES), the control section 4 determines whether or not the number of times of the parking at the coordinates of the current own vehicle position has exceeded a predefined reference number of times, with this parking (step S406). If it is determined that the number of times of the parking at the coordinates of the current own vehicle position has not exceeded the predefined reference number of times (step S406; NO), the control section 4 increments the number of times of the parking corresponding to the coordinates of the current own vehicle position in the parking position coordinate table by 1 (step S407), and terminates this process.

If it is determined that the number of times of the parking at the coordinates of the current own vehicle position has exceeded the predefined reference number of times, with this parking (step S406; YES), the control section 4 changes the home registration spot information in the "home registration spot information" area of the storage unit 1f, to the coordinates of the current own vehicle position, registers the home registration spot information (step S408), executes the member registration cancellation setting process (step S409), and terminates this process. Since the member registration cancellation setting process is similar to that described in the first embodiment, a description thereof is omitted.

As described above, according to the fourth embodiment, the control section 4 has stored the coordinates of the parking position at the position different from the home registration spot information registered in the storage unit 1f of the vehicle-mounted device 10, and the number of times of the parking at the parking position, in the parking position coordinate table, and if the number of times of the parking at the current own vehicle position has exceeded the predefined reference number of times, changes the registration of the home registration spot information in the storage unit 1f, to the parking position, and also, executes the member registration cancellation setting process, deletes the content information and the uplink information except the fundamental information, which are stored in the storage unit 1f, and sets ON the member registration cancellation flag. Moreover, when the communication with the center apparatus 30 is established, the control section 4 determines whether or not the member registration cancellation flag is set ON, and if the member registration cancellation flag is set ON, the control section 4 writes the code indicating the member registration cancellation, in the fundamental information in the uplink information, and transmits the uplink information to the center apparatus 30. When the center apparatus 30 receives the uplink information from the vehicle-mounted device 10, the center apparatus 30 determines whether or not the code indicating the member registration cancellation is included in the fundamental information, and if the center apparatus 30 determines that the code indicating the member registration cancellation is included, the center apparatus 30 deletes the member registration information on the record having the vehicle-mounted device ID of the sender vehicle-mounted device 10, from the member information DB 341, and transmits the content information for notifying of the member registration cancellation, to the vehicle-mounted device 10.

Therefore, when the number of times of the parking at the position different from the home registration spot information has exceeded the predefined reference number of times, the content information and the uplink information which are stored in the storage unit 1f, as well as the personal information registered in the center apparatus 30, and the like can be automatically deleted. Consequently, for example, in the case where the vehicle on which the vehicle-mounted device 10 is mounted has been replaced, or the like, the distribution of the content information set for the previous user can be prevented, or the personal information on the previous user can be prevented from remaining in the vehicle-mounted device.

While the first to fourth embodiments have been described above, the above described embodiments are a preferable example of the present invention, and the present invention is not limited thereto.

For example, the member registration cancellation in the center apparatus 30 can also be performed through an application form or the like on the Internet, a postcard or the like. For example, when a Web page provided by the provider is accessed from the vehicle-mounted device 10 or a personal computer including an Internet connection function, the vehicle-mounted device ID and the like are inputted, and application for the member registration cancellation is made, the center apparatus 30 deletes the member registration information corresponding to the vehicle-mounted device ID described in the application for the member registration cancellation, from the member information DB. This ensures determination as a nonmember in member/nonmember authentication after next area-in, and thus the distribution service is not provided.

Moreover, a expiration time may be provided for the member information and the provider code in the uplink information, or the member registration information in the center apparatus 30, and the member registration may be cancelled when there is no update through the connection of the vehicle-mounted device ID for a certain period of time.

Moreover, in the above described embodiments, the control section 4 detects the parking of the vehicle C (own vehicle) by detecting the input of the signal (OFF signal) indicating that the engine switch key 6 has been turned OFF, via the I/F 5. However, the detection of the parking is not limited thereto, and for example, the parking of the vehicle C (own vehicle) may be detected by detecting that the vehicle-mounted device 10 is powered OFF.

In addition, detailed configurations and detailed operations of the respective apparatuses included in the information distribution system 100 can also be changed as appropriate in the scope not deviating from the gist of the invention.

The invention claimed is:

1. A vehicle-mounted device, comprising:
   a communication unit configured to transmit and receive data to and from a center apparatus for distributing content information from any one of a plurality of providers, via a roadside apparatus;
   a member registration cancellation setting unit configured to set member registration cancellation information including information for each of the providers which provides a distribution service of the content information;
   a writing unit configured to receive information for the providers when communication with the center apparatus is automatically established, and if it is determined to be a distribution service from a subscribed provider, to determine whether or not the member registration cancellation information is set, and if the member registration cancellation information is set, to write information indicating member registration cancellation in predetermined items of uplink information to be transmitted to the center apparatus;
   an uplink information transmission unit configured to transmit the uplink information to the center apparatus by the communication unit;
   a current location detection unit configured to detect position information on a current location;
   a parking detection unit configured to detect parking of a vehicle on which the vehicle-mounted device is mounted;
   a home registration point storage unit configured to store home registration point information; and
   a home registration point changing unit configured, when the parking of the vehicle on which the vehicle-mounted device is mounted has been detected by the parking detection, if the number of times in which the position information on the current location detected by the current location detection unit and position information indicated by the home registration point information stored in the home registration point storage unit do not coincide with each other has exceeded a predefined reference number of times, to change the home registration point information stored in the home registration point storage unit to the position information on the current location,
   wherein if the home registration point information stored in the home registration point storage unit has been changed by the home registration point changing unit, the member registration cancellation setting unit sets the member registration cancellation information on the distribution service.

2. The vehicle-mounted device according to claim 1, comprising:
   a storage unit configured to store the content information distributed from the center apparatus, and the uplink information to be transmitted to the center apparatus,
   wherein when the member registration cancellation setting unit sets the member registration cancellation information on the distribution service of the content information, the member registration cancellation setting unit deletes the content information and the uplink information which are stored in the storage unit.

3. The vehicle-mounted device according to claim 1, further comprising:
   an operating unit configured to instruct to perform the member registration cancellation of the distribution service,
   wherein if the instruction to perform the member registration cancellation of the distribution service has been issued through the operating unit, the member registration cancellation setting unit sets the member registration cancellation information on the distribution service.

4. The vehicle-mounted device according to claim 1, further comprising:
   an operating unit configured to instruct to change the home registration point information stored in the home registration point storage unit,
   wherein if the home registration point information stored in the home registration point storage unit has been changed in response to an operation of the operating unit, the member registration cancellation setting unit sets the member registration cancellation information on the distribution service.

5. A vehicle-mounted device comprising:
   a communication unit configured to transmit and receive data to and from a center apparatus for distributing content information from any one of a plurality of providers, via a roadside apparatus;
   a member registration cancellation setting unit configured to set member registration cancellation information including information for each of the providers which provides a distribution service of the content information;
   a writing unit configured to receive information for the providers when communication with the center apparatus is automatically established, and if it is determined to be a distribution service from a subscribed provider, to determine whether or not the member registration cancellation information is set, and if the member registration cancellation information is set, to write information indicating member registration cancellation in predetermined items of uplink information to be transmitted to the center apparatus;

an uplink information transmission unit configured to transmit the uplink information to the center apparatus by the communication unit;

a current location detection unit configured to detect position information on a current location;

a parking detection unit configured to detect parking of a vehicle on which the vehicle-mounted device is mounted;

a home registration point storage unit configured to store home registration point information; and a home registration point changing unit configured, when the parking of the vehicle on which the vehicle-mounted device is mounted has been detected by the parking detection, determining whether or not the number of times of the parking of the vehicle at the current location detected by the current location detection unit has exceeded a predefined reference number of times, and if it is determined that the number of times of the parking has exceeded the predefined reference number of times, to change the home registration point information stored in the home registration point storage unit to the position information on the current location detected by the current location detection unit, wherein if the home registration point information stored in the home registration point storage unit has been changed by the home registration point changing unit, the member registration cancellation setting unit sets the member registration cancellation information on the distribution service.

6. The vehicle-mounted device according to claim 5, further comprising:

a storage unit configured to store the content information distributed from the center apparatus, and the uplink information to be transmitted to the center apparatus, wherein when the member registration cancellation setting unit sets the member registration cancellation information on the distribution service of the content information, the member registration cancellation setting unit deletes the content information and the uplink information which are stored in the storage unit.

7. The vehicle-mounted device according to claim 5, further comprising:

an operating unit configured to instruct to perform the member registration cancellation of the distribution service, wherein if the instruction to perform the member registration cancellation of the distribution service has been issued through the operating unit, the member registration cancellation setting unit sets the member registration cancellation information on the distribution service.

8. The vehicle-mounted device according to claim 5, further comprising:

an operating unit configured to instruct to change the home registration point information stored in the home registration point storage unit, wherein if the home registration point information stored in the home registration point storage unit has been changed in response to an operation of the operating unit, the member registration cancellation setting unit sets the member registration cancellation information on the distribution service.

* * * * *